United States Patent
Masago et al.

(10) Patent No.: US 9,632,691 B2
(45) Date of Patent: Apr. 25, 2017

(54) NON-TRANSITORY COMPUTER-READABLE MEDIUM STORING SELECTED CHARACTER SPECIFICATION PROGRAM, SELECTED CHARACTER SPECIFICATION METHOD, AND SELECTED CHARACTER SPECIFICATION DEVICE

(71) Applicant: FUJITSU LIMITED, Kawasaki-shi, Kanagawa (JP)

(72) Inventors: Hiroshi Masago, Yokohama (JP); Hideto Higashi, Yokohama (JP); Masahiro Kataoka, Tama (JP)

(73) Assignee: FUJITSU LIMITED, Kawasaki (JP)

( * ) Notice: Subject to any disclaimer, the term of this patent is extended or adjusted under 35 U.S.C. 154(b) by 221 days.

(21) Appl. No.: 14/332,817

(22) Filed: Jul. 16, 2014

(65) Prior Publication Data

US 2015/0033185 A1 Jan. 29, 2015

(30) Foreign Application Priority Data

Jul. 29, 2013 (JP) ................................. 2013-156560

(51) Int. Cl.
*G06F 3/048* (2013.01)
*G06F 3/0488* (2013.01)
(Continued)

(52) U.S. Cl.
CPC ............ *G06F 3/0488* (2013.01); *G06F 3/018* (2013.01); *G06F 3/04842* (2013.01)

(58) Field of Classification Search
CPC .... G06F 3/0488; G06F 3/04842; G06F 3/017; G06F 3/018
See application file for complete search history.

(56) References Cited

U.S. PATENT DOCUMENTS 5,594,810 A * 1/1997 Gourdol .............. G06F 3/04883
382/186
5,796,866 A * 8/1998 Sakurai .............. G06K 9/00409
382/187

(Continued)

FOREIGN PATENT DOCUMENTS

JP 8-147095 A 6/1996
JP 2001-255867 9/2001

(Continued)

OTHER PUBLICATIONS

Japanese Office Action mailed Feb. 7, 2017 for corresponding Japanese Patent Application No. 2013-156560, with English Translation, 9 pages.

*Primary Examiner* — Dino Kujundzic
(74) *Attorney, Agent, or Firm* — Fujitsu Patent Center

(57) ABSTRACT

A non-transitory computer-readable medium storing a selected character specification program that causes a computer to execute a process including detecting a character region indicating a region, in which each character of the displayed character string is displayed on a screen, based on character string display information, specifying a stroke of a closed curved line designated on the screen based on input operation information, and specifying one or a plurality of successive characters, in which a ratio of an area of a selected region based on uppermost, lowermost, leftmost, and rightmost points of the stroke of the closed curved line in the character region to an area of the character region exceeds a threshold, as selected character among a respective character of the displayed character string overlapped with the stroke of the closed curved line.

10 Claims, 23 Drawing Sheets

(51) Int. Cl.
*G06F 3/0484* (2013.01)
*G06F 3/01* (2006.01)

(56) References Cited

U.S. PATENT DOCUMENTS

| | | | | |
|---|---|---|---|---|
| 6,903,751 | B2* | 6/2005 | Saund | G06T 11/60 |
| | | | | 345/619 |
| 7,259,753 | B2* | 8/2007 | Keely | G06F 17/211 |
| | | | | 345/179 |
| 7,812,860 | B2* | 10/2010 | King | G06F 17/30011 |
| | | | | 348/210.99 |
| 8,166,388 | B2* | 4/2012 | Gounares | G06F 3/0481 |
| | | | | 715/230 |
| 8,539,349 | B1* | 9/2013 | Kirshenbaum | G06F 17/27 |
| | | | | 704/10 |
| 2001/0005207 | A1 | 6/2001 | Muikaichi et al. | |
| 2003/0214536 | A1* | 11/2003 | Jarrett | G06K 9/222 |
| | | | | 715/831 |
| 2006/0050969 | A1* | 3/2006 | Shilman | G06F 3/04883 |
| | | | | 382/224 |
| 2007/0115264 | A1* | 5/2007 | Yu | G06F 3/04883 |
| | | | | 345/173 |
| 2007/0125860 | A1* | 6/2007 | Lapstun | G06F 3/0321 |
| | | | | 235/462.01 |
| 2011/0188071 | A1 | 8/2011 | Yoshida | |
| 2012/0023447 | A1 | 1/2012 | Hoshino et al. | |
| 2012/0096345 | A1* | 4/2012 | Ho | G06F 3/017 |
| | | | | 715/252 |
| 2012/0117461 | A1 | 5/2012 | Sata et al. | |

FOREIGN PATENT DOCUMENTS

| | | |
|---|---|---|
| JP | 2010-109479 | 5/2010 |
| JP | 2010-130214 | 6/2010 |
| JP | 2011-108025 | 6/2011 |
| JP | 2012-27721 A | 2/2012 |
| JP | 2012-103872 A | 5/2012 |
| JP | 2012-221367 | 11/2012 |
| WO | 2009-075061 | 6/2009 |

* cited by examiner

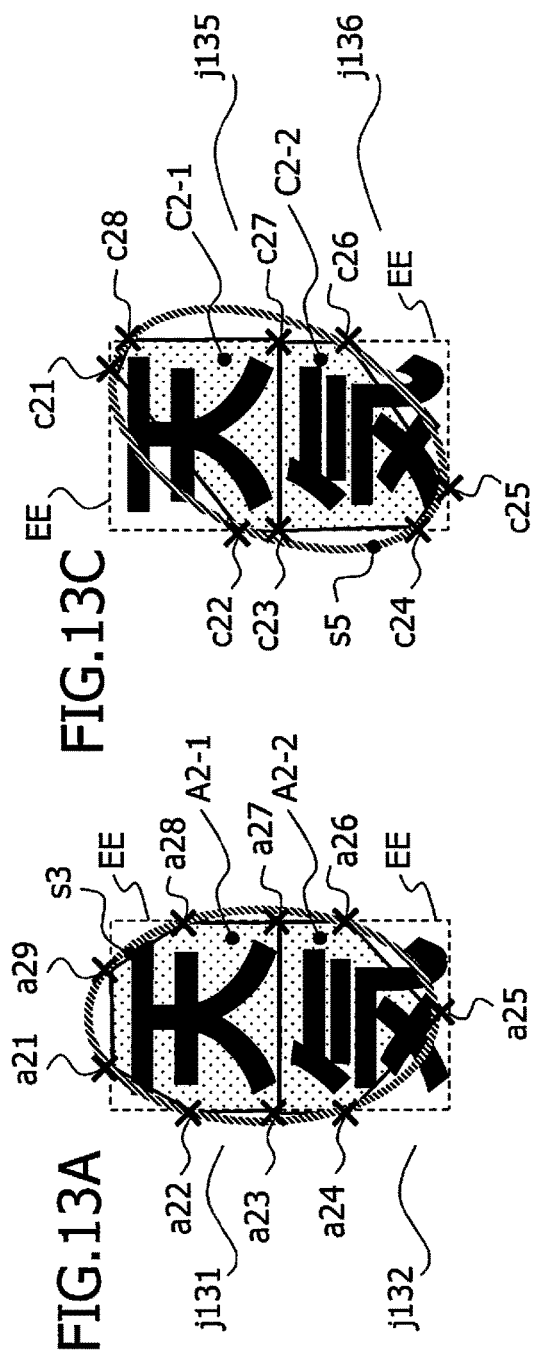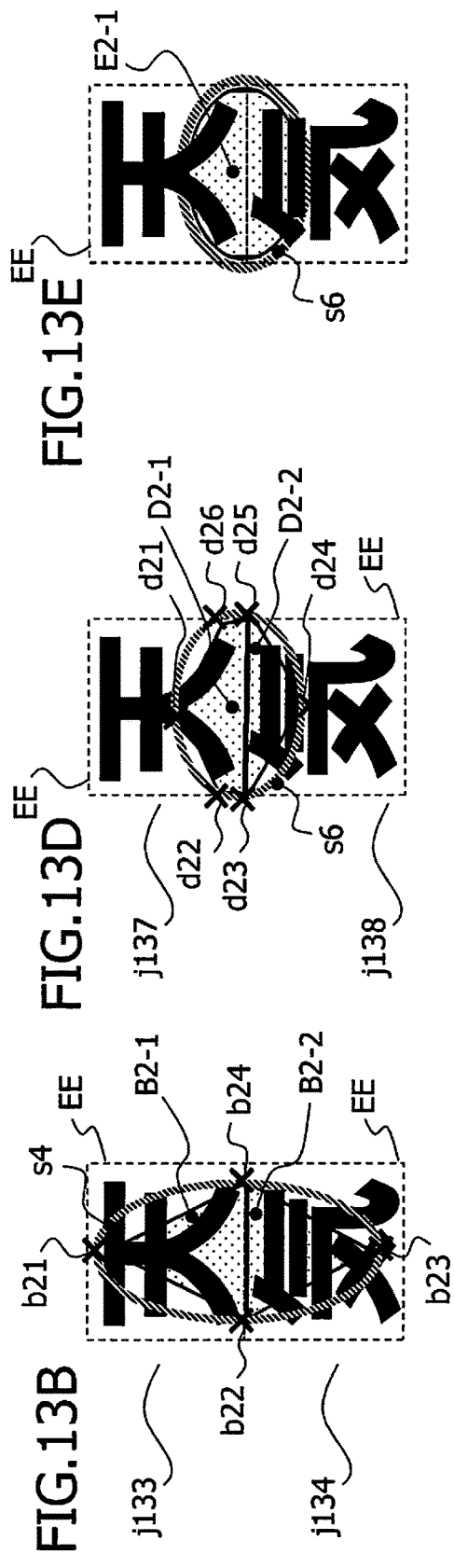

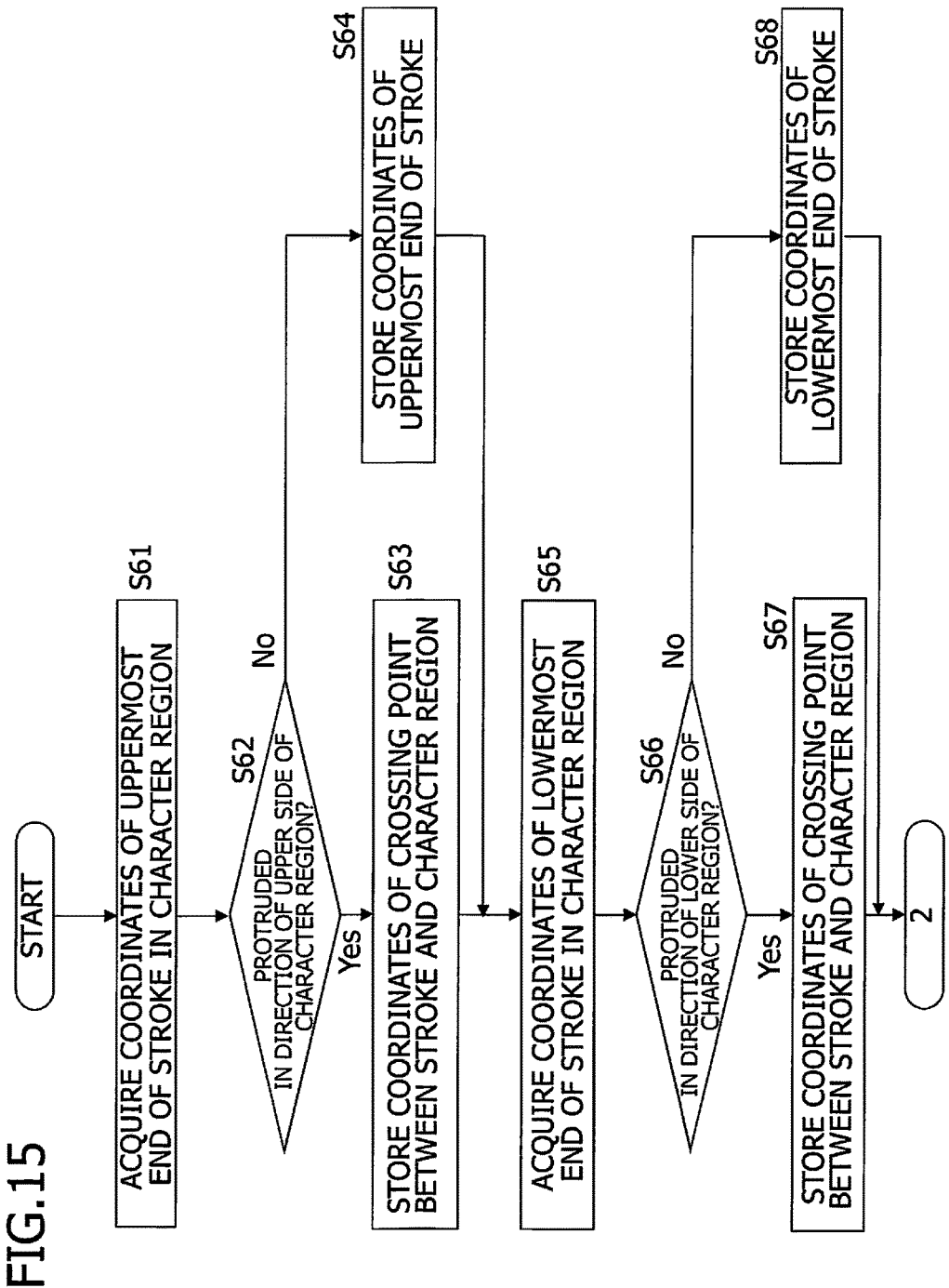

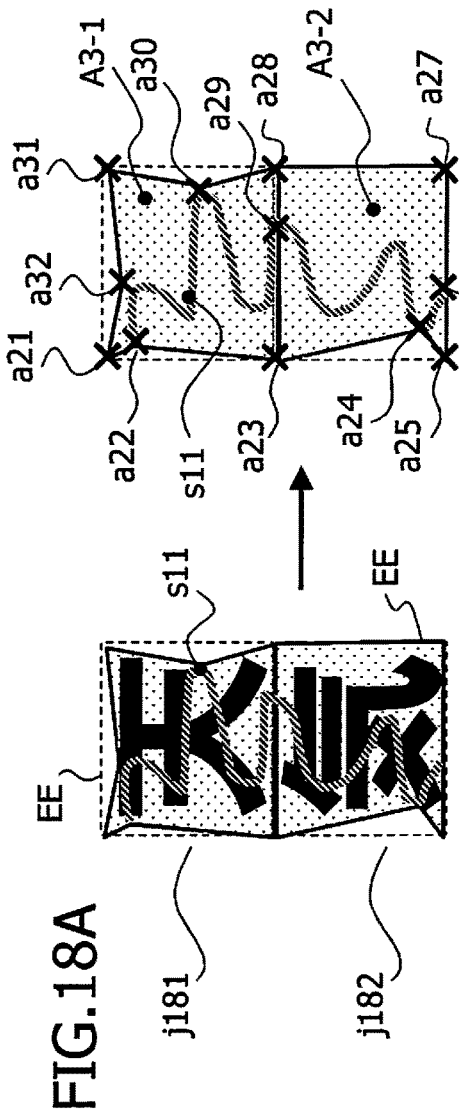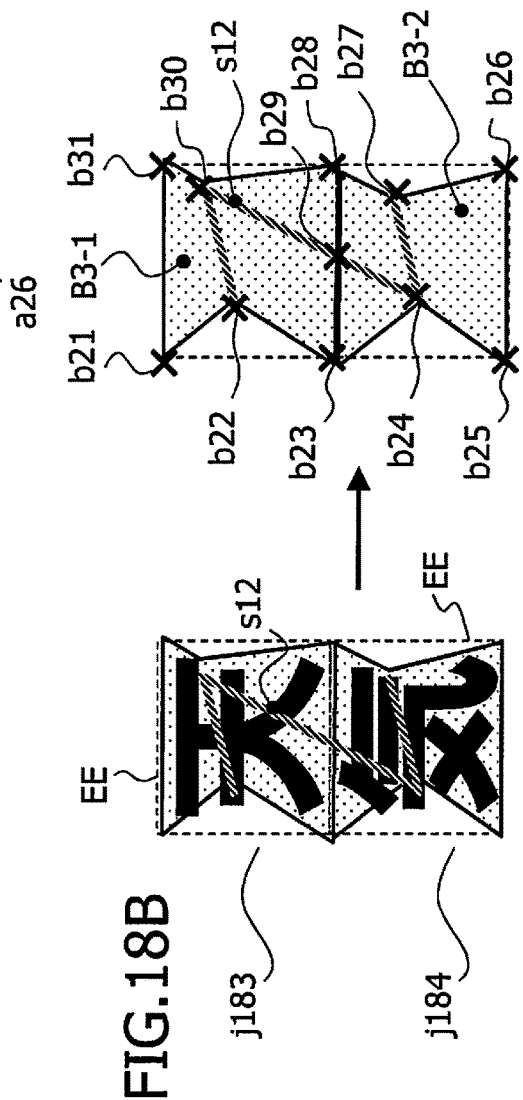
FIG.18A
FIG.18B

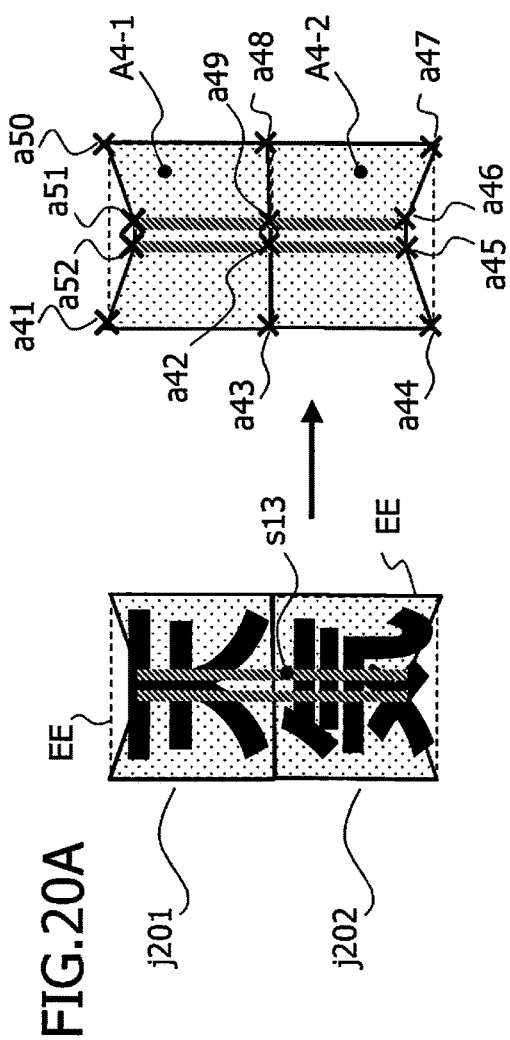
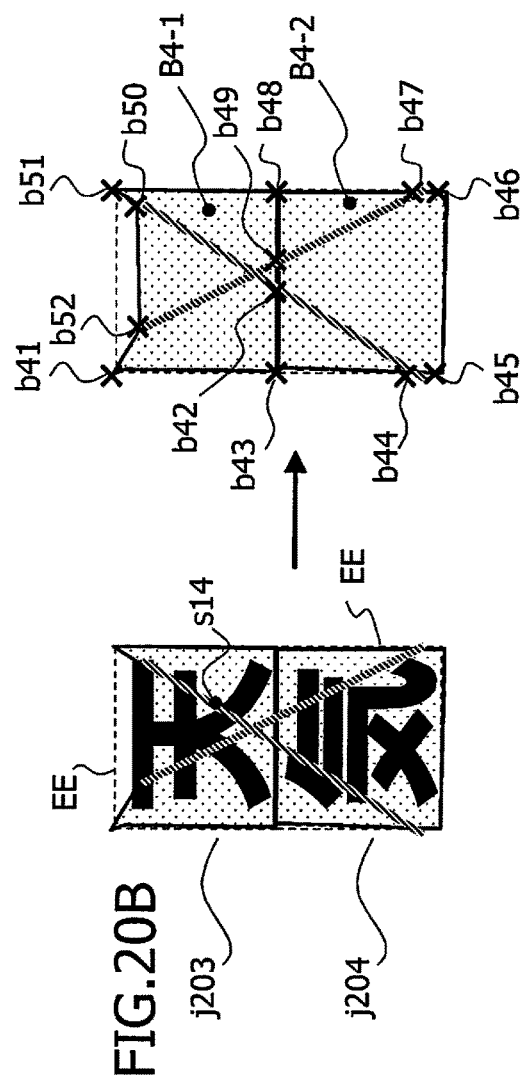
FIG. 20A
FIG. 20B

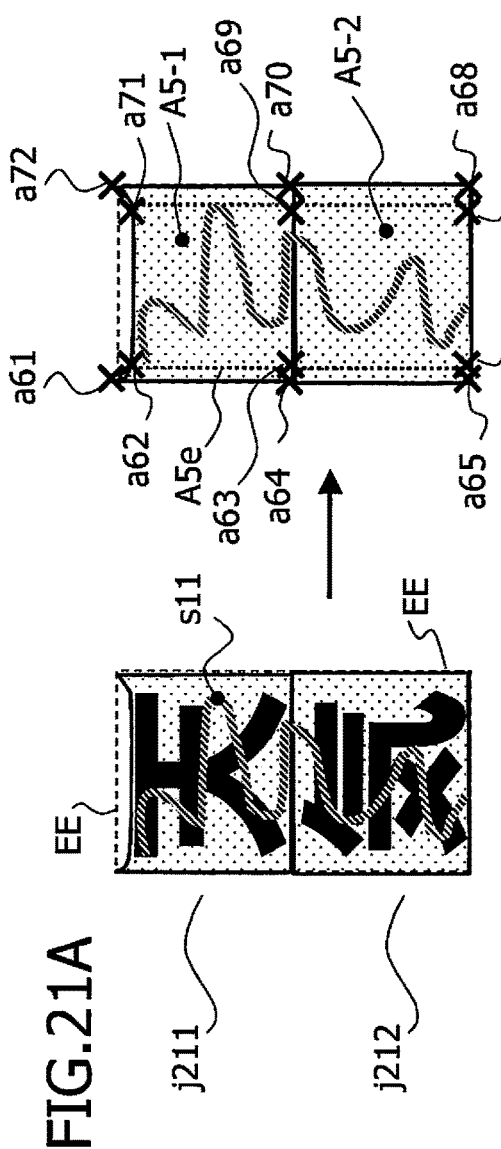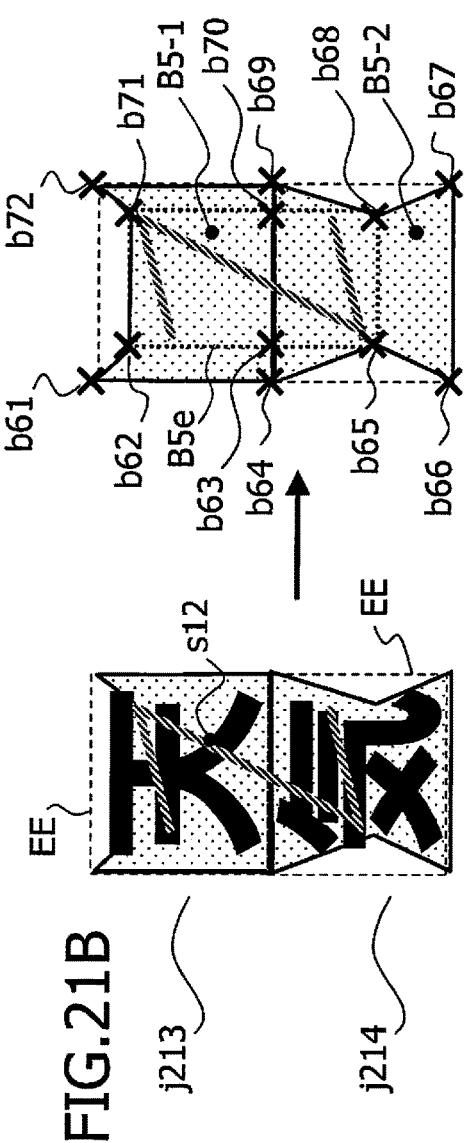
FIG.21A
FIG.21B

NON-TRANSITORY COMPUTER-READABLE MEDIUM STORING SELECTED CHARACTER SPECIFICATION PROGRAM, SELECTED CHARACTER SPECIFICATION METHOD, AND SELECTED CHARACTER SPECIFICATION DEVICE

CROSS-REFERENCE TO RELATED APPLICATION

This application is based upon and claims the benefit of priority of the prior Japanese Patent Application No. 2013-156560, filed on Jul. 29, 2013, the entire contents of which are incorporated herein by reference.

FIELD

The embodiment discussed herein is related to a non-transitory computer-readable medium storing a selected character specification program, a selected character specification method, and a selected character specification device.

BACKGROUND

On the display screens of terminals such as smart phones and tablets, electronic books or the like are, for example, displayed. Accordingly, there have been developed technologies to perform selection operations and input operations on character strings displayed on screens based on the touch devices of terminals (see, for example, Japanese Patent Application Laid-open No. 2012-221367 and Japanese Patent Application Laid-open No. 2010-130214).

Generally, methods of controlling one or a plurality of characters to be selected are based on character selection methods provided by operating systems (hereinafter referred to as OSs). Specifically, users select object character strings among those displayed on screens by, for example, tracing or tapping the screens with fingers. Alternatively, the users input character strings using software keyboards installed in smart phones or the like. In this manner, input characters are controlled to be selected.

Patent Literature 1: Japanese Patent Application Laid-open No. 2012-221367
Patent Literature 2: Japanese Patent Application Laid-open No. 2010-130214

SUMMARY

However, it is difficult to select object characters based on such a tracing or tapping operation, and thus the erroneous selection of characters is easily caused. On the other hand, software keyboards have small key areas for the input of characters, and thus the input of characters with the software keyboards is difficult. In addition, a number of key inputs may be required to fix desired characters for the input of the characters, which makes the input operation complicated. Note that although methods of connecting hardware keyboards to terminals have also been proposed, they may require time and effort.

Moreover, a character selection method provided by OSs is limited to the common character selection system of the OSs. Accordingly, in a case in which a more effective character selection method is used, applications may be required to have the character selection method. Therefore, it has been difficult to perform a more effective character selection method in applications.

According to a first aspect of the embodiment, a non-transitory computer-readable medium storing a selected character specification program that causes a computer to execute a process including detecting a character region indicating a region, in which each character of the displayed character string is displayed on a screen, based on character string display information including a position of a first character of the displayed character string, a character size of each character of the displayed character string, and space between lines of displayed character strings, specifying a stroke of a closed curved line designated on the screen based on input operation information, and specifying one or a plurality of successive characters, in which a ratio of an area of a selected region based on uppermost, lowermost, leftmost, and rightmost points of the stroke of the closed curved line in the character region to an area of the character region exceeds a threshold, as selected character among a respective character of the displayed character string overlapped with the stroke of the closed curved line.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 13A to FIG. 13E are second diagrams each illustrating a specific example of the stroke of a closed curved line and a selected region.

FIG. 15 is a first flowchart for illustrating the details of the selected character specification processing in a case in which the stroke of a curved line or a broken line is input.

FIG. 18A and FIG. 18B are diagrams each illustrating a specific example of the stroke of a curved line or a broken line and a selected region.

FIG. 20A and FIG. 20B are diagrams each illustrating a specific example of a plurality of strokes and a selected region.

FIG. 21A and FIG. 21B are diagrams each illustrating another generation example of a selected region.

DESCRIPTION OF EMBODIMENTS

An embodiment of the present invention will be described below with reference to the drawings. It is to be noted that the technical scope of the present invention is not limited to the embodiment, and includes matters described in the claims and their equivalents.

(Configuration of Selected Character Specification Device)

Figure 1:
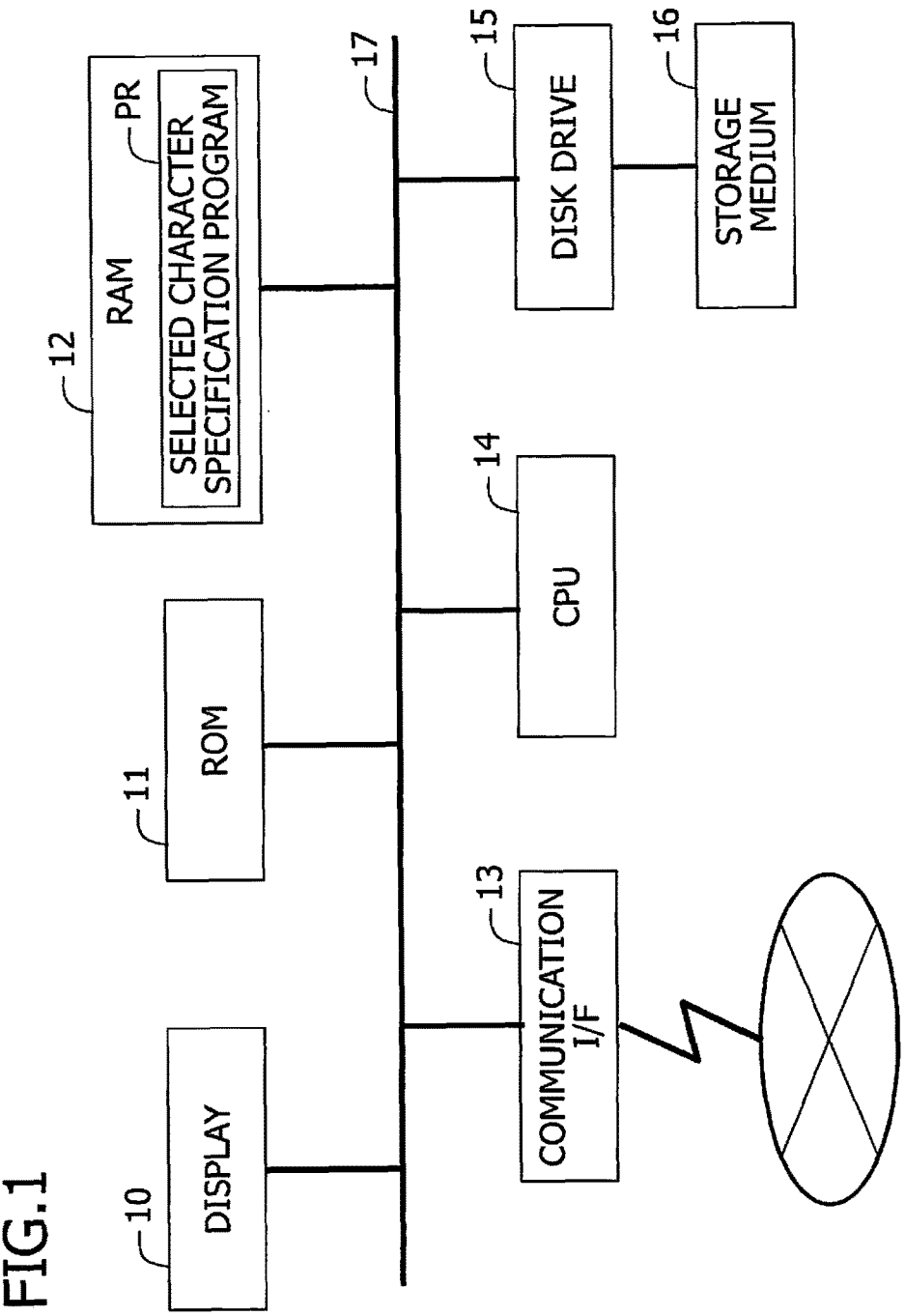
FIG. 1 is a diagram illustrating an example of the configuration of a selected character specification device according to the embodiment.

FIG. 1 is a diagram illustrating an example of the configuration of a selected character specification device according to the embodiment. The selected character specification device in FIG. 1 represents, for example, a terminal such as a smart phone and a tablet terminal. The selected character specification device includes, for example, a display 10, a ROM 11, a RAM 12, a communication interface 13, a central processing unit (CPU) 14, a disk drive 15, or the like. The respective units are capable of being connected to each other via a bus 17.

The communication interface 13 of the selected character specification device in FIG. 1 controls communication processing with respect to external terminals or equipment. The display 10 represents, for example, the display screen of the terminal. The disk drive 15 controls the read processing and write processing of information with respect to a storage medium 16. The read only memory (ROM) 11 stores the control program of the terminal or the like. The random access memory (RAM) 12 stores, for example, a selected character specification program PR according to the embodiment. The CPU 14 performs selected character specification processing according to the embodiment in cooperation with the selected character specification program PR.

(Block Diagram of Selected Character Specification Device)

Figure 2:
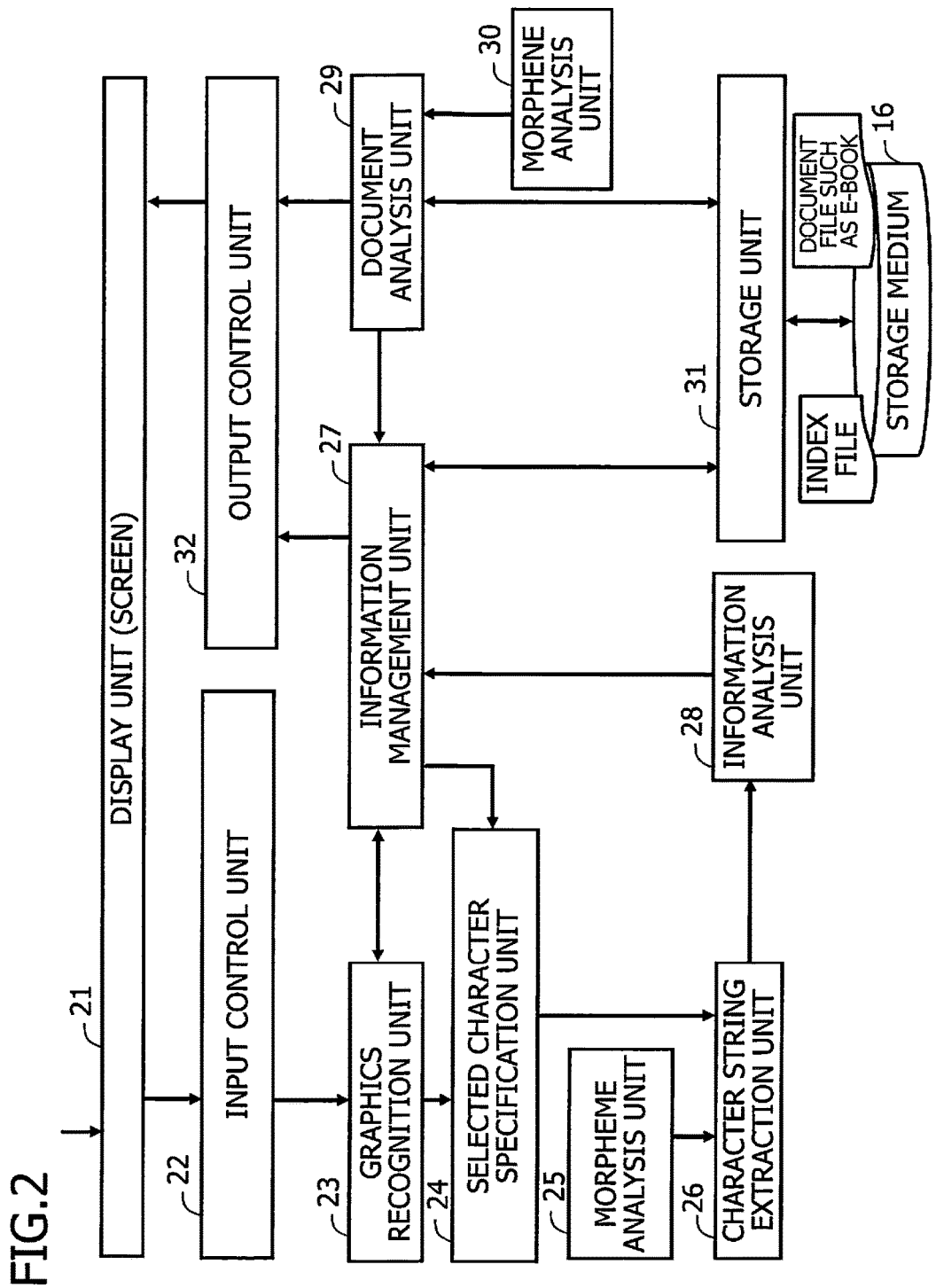
FIG. 2 is a diagram illustrating an example of the block diagram of the selected character specification device according to the embodiment.

FIG. 2 is a diagram illustrating an example of the block diagram of the selected character specification device according to the embodiment. The selected character specification device according to the embodiment includes, for example, a display unit 21, an input control unit 22, a graphics recognition unit 23, a selected character specification unit 24, a morpheme analysis unit 25, a character string extraction unit 26, an information management unit 27, an information analysis unit 28, a document analysis unit 29, a morpheme analysis unit 30, a storage unit 31, and an output control unit 32.

The storage unit 31 controls, for example, the read processing and write processing of information with respect to the storage medium 16 such as a hard disk and an SD card. The storage medium 16 stores character strings (hereinafter referred to as displayed character strings, character codes) to be displayed on the display screen of the terminal and stores graphics information, thresholds, or the like used in the selected character specification processing.

The document analysis unit 29 generates character string display information based on displayed character strings read from the storage unit 31 and outputs the generated character string display information to the output control unit 32 and the information management unit 27. The character string display information will be described later. In addition, the document analysis unit 29 causes the morpheme analysis unit 30 to generate the word-by-word-basis segment information of displayed character strings and the information of the parts of speech of words and outputs the generated information to the output control unit 32. The output control unit 32 controls the output of displayed character strings to the display unit 21. The information management unit 27 reads graphics information and a threshold from the storage unit 31, acquires character string display information from the document analysis unit 29, and outputs the graphics information, the threshold, and the character string display information thus obtained to the graphics recognition unit 23 and the selected character specification unit 24.

The display unit 21 detects the input of a stroke designated on the screen based on input operation information and outputs input information to the input control unit 22. The stroke is input, for example, by a finger or a stylus. The input control unit 22 outputs the coordinate information of the stroke designated by the input information to the graphics recognition unit 23, and the graphics recognition unit 23 recognizes graphics information corresponding to the shape of the stroke and outputs the recognized graphics information to the selected character specification unit 24. The selected character specification unit 24 specifies a selected character among one or a plurality of selected candidate characters overlapped with the stroke in a displayed character string and outputs the information (character code) of the selected character to the character string extraction unit 26.

The character string extraction unit 26 corrects the specified selected character based on the word-by-word-basis segment information generated by the morpheme analysis unit 25 and outputs the information (character code) of the finally-fixed selected character to the information analysis unit 28. The information analysis unit 28 outputs the information of the finally-fixed selected character, the information of the difference between the specified selected character and the finally-fixed selected character, or the like to the information management unit 27. Then, the information management unit 27 outputs the information of the finally-fixed selected character to the output control unit 32. The output control unit 32 controls the display color and background color of the selected character on the screen. Thus, a user is allowed to detect the designation result of the stroke with respect to the screen and the specified selected character.

(Status of Selected Character Specification Program)

Figure 3A:
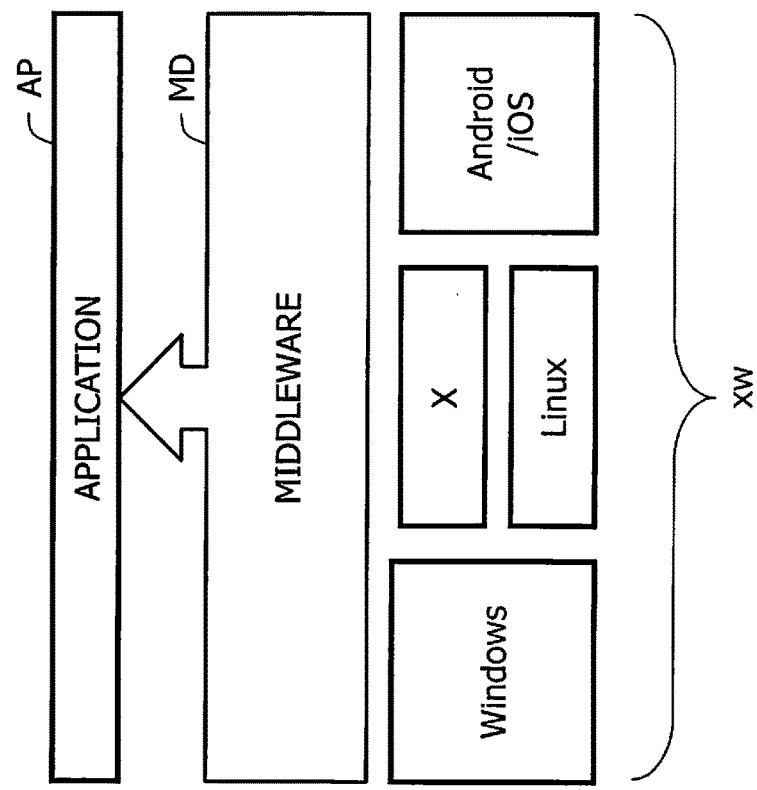
FIG. 3A and FIG. 3B are diagrams each illustrating the status of a selected character specification program.
Figure 3B:
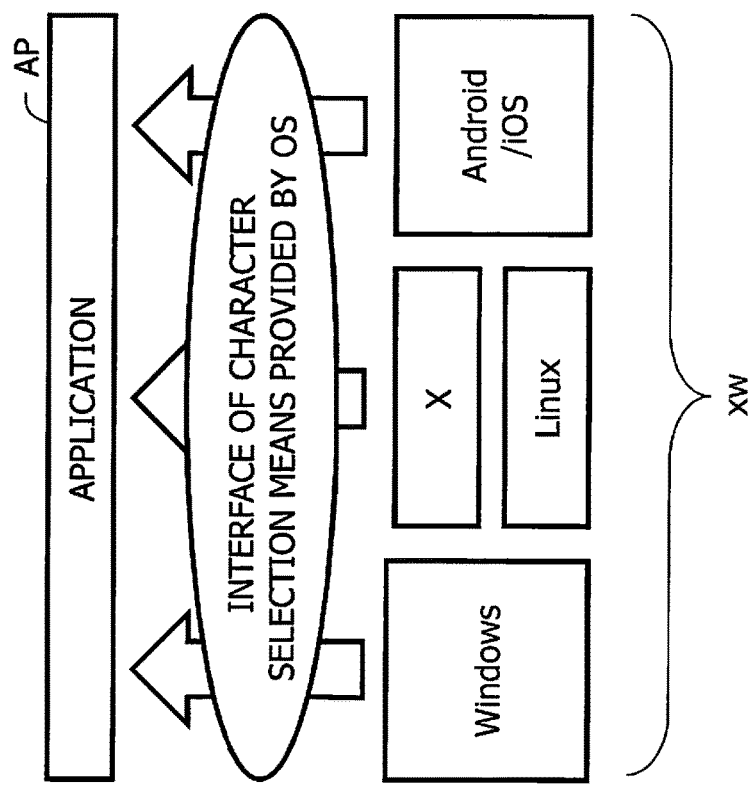

FIG. 3A and FIG. 3B are diagrams each illustrating the status of a selected character specification program. FIG. 3A is a diagram illustrating the status of a general selected character specification program. Generally, the character selection program of a terminal is provided by, for example, an operating system (hereinafter referred to as an OS). That is, each application AP operating on an OS uses the interface of a character selection program provided by an OS xw of each platform. Therefore, the function of the selected character specification processing of each application AP operating on an OS is limited to the function of a character selection program provided by an OS xw.

On the other hand, FIG. 3B is a diagram illustrating the status of the selected character specification program according to the embodiment. Here, the selected character specification program PR according to the embodiment is provided as, for example, middleware MD. The middleware MD represents software that mediates between an OS xw and each application AP. That is, each application AP operating on an OS is allowed to use the interface of the selected character specification program PR in the layer of the middleware MD. Thus, without being limited to the function of a character selection program provided by an OS xw, each application AP is allowed to perform the selection processing of characters more efficiently based on the selected character specification program PR according to the embodiment.

(Outline of Selected Character Specification Processing)

Figure 4:
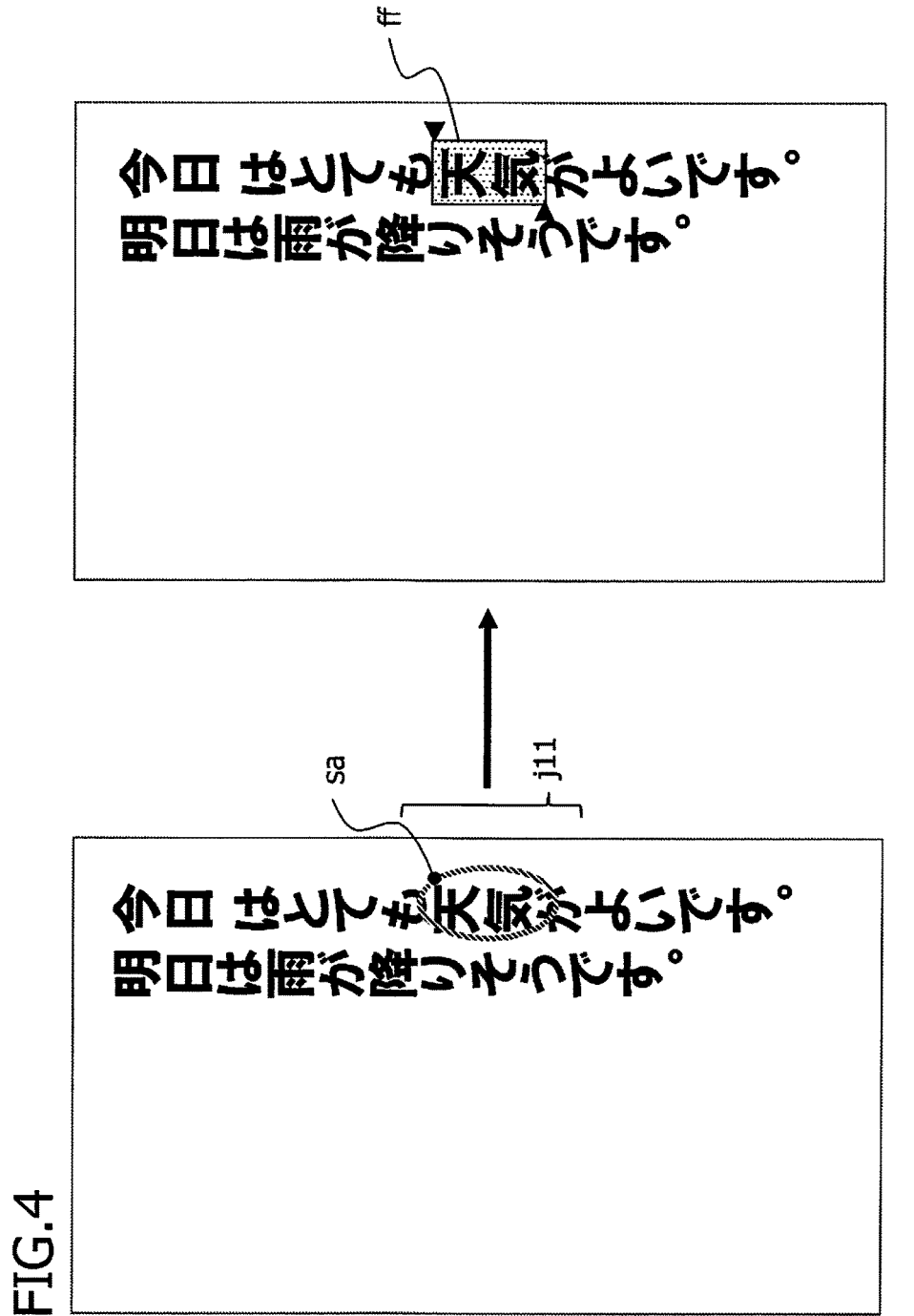
FIG. 4 is a diagram illustrating the outline of the selected character specification processing.

FIG. 4 is a diagram illustrating the outline of the selected character specification processing according to the embodiment. In the embodiment, a user surrounds the vicinity of one or a plurality of characters as selected objects in a displayed character string displayed on the screen of the terminal with a stroke sa of a closed curved line designated by a hand, a stylus, or the like. In this example, the character string "mo ten ki ga (in Japanese language expression)" j11 is surrounded with the stroke sa of the closed curved line. Then, the selected character specification program PR according to the embodiment specifies the character string "ten ki (in Japanese language expression)" ff as a selected character in the character string "mo ten ki ga (in Japanese language expression)" j11 overlapped with the stroke sa.

Figure 5:
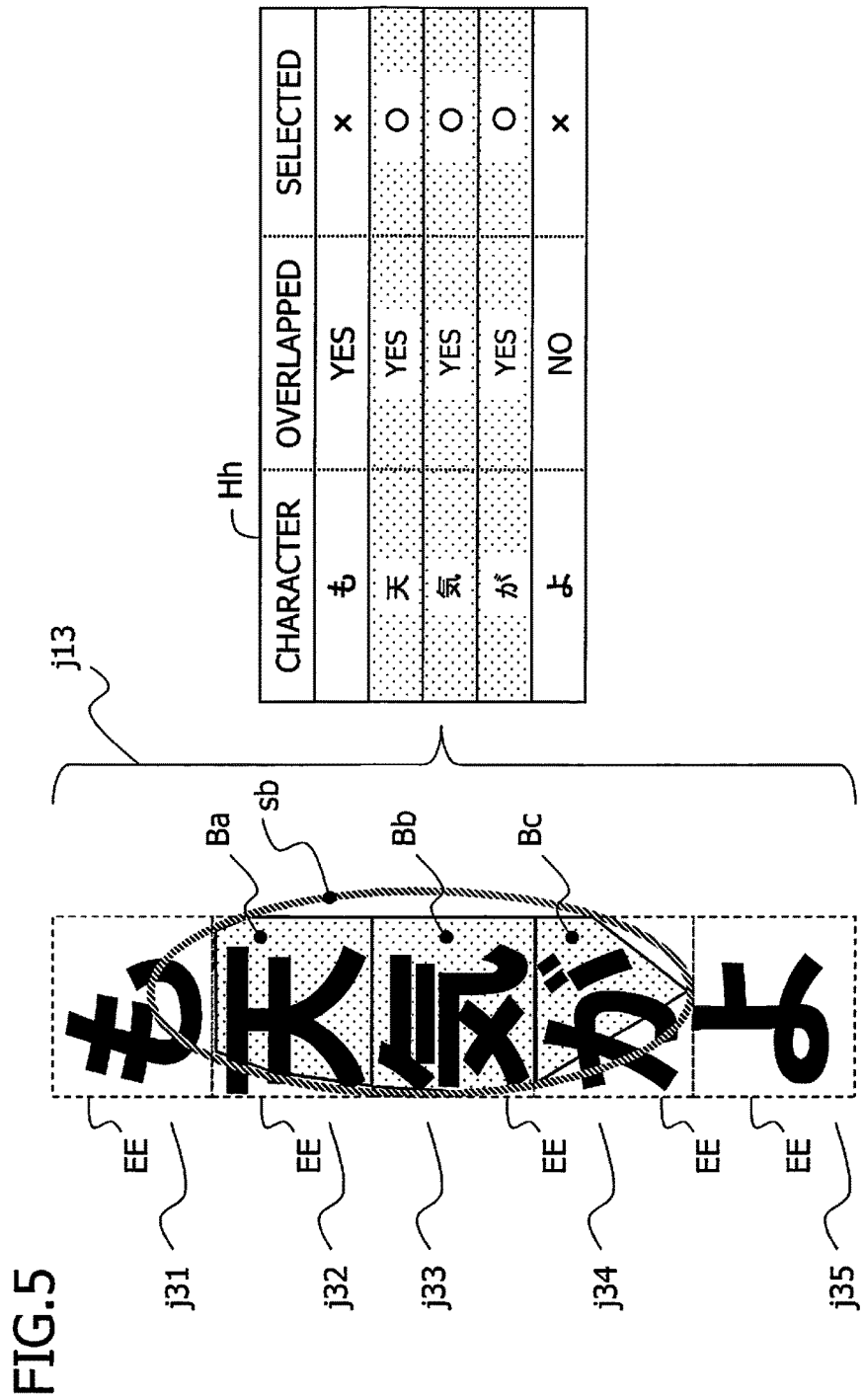
FIG. 5 is a diagram more specifically illustrating the outline of the selected character specification processing.

FIG. 5 is a diagram more specifically illustrating the outline of the selected character specification processing according to the embodiment. A table Hh in FIG. 5 is a table illustrating determination results as to whether each character in the character string "mo ten ki ga yo (in Japanese language expression)" j13. In addition, in FIG. 5, each dotted rectangle including each character in the character string "mo ten ki ga yo (in Japanese language expression)" j13 represents a character region EE.

The selected character specification program PR performs the selected character specification processing of each of the selected candidate characters "mo (in Japanese language expression)" j31, "ten (in Japanese language expression)" j32, "ki (in Japanese language expression)" j33, and "ga (in Japanese language expression)" j34 overlapped with a stroke sb. Specifically, the selected character specification program PR generates selected regions Ba to Bc based on, for example, the uppermost, lowermost, leftmost, and rightmost points of the stroke sb in the character regions EE. Then, the selected character specification program PR specifies the selected candidate characters as selected characters when the ratios of the areas of the selected regions Ba to Bc to the corresponding character regions EE exceed a threshold.

In the example of FIG. 5, the ratios of the areas of the selected regions Ba to Bc of the selected candidate characters "ten" j32, "ki" j33, and "ga" j34 among the selected candidate characters "mo" j31, "ten" j32, "ki" j33, and "ga" j34 to the corresponding character regions EE exceed a threshold. Therefore, the selected character specification program PR specifies the character string "ten ki ga (in Japanese language expression)" j32, j33, j34 as selected characters. Note that the examples of FIG. 4 and FIG. 5 illustrate the cases in which the characters are selected by the strokes sa and sb of the closed curved lines. However, characters may be selected by one or a plurality of stokes of straight lines, curved lines, broken lines, or the like. Examples of one or a plurality of strokes of straight lines, curved lines, broken lines, or the like will be described later.

Next, the processing of the selected character specification program PR according to the embodiment will be described based on flowcharts.

(Flowcharts: Processing of Selected Character Specification Program)

Figure 6B:
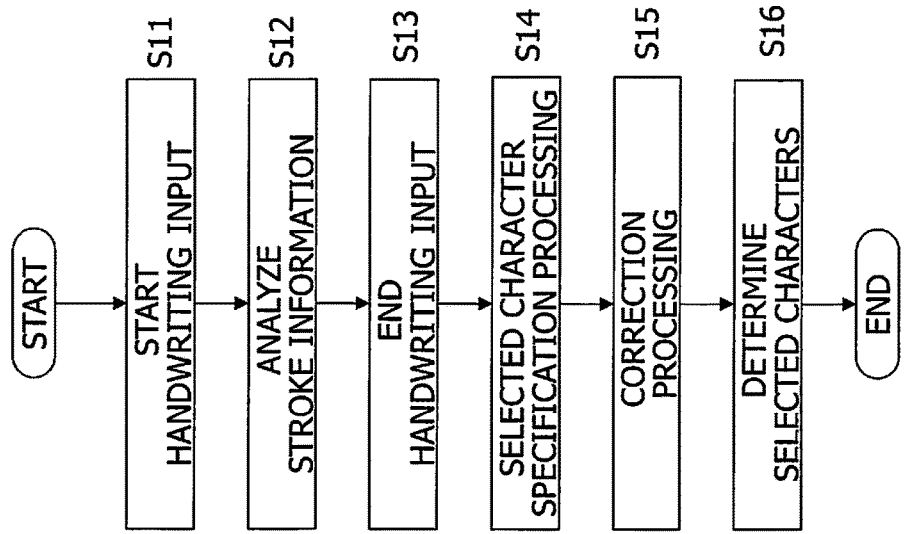
FIG. 6A and FIG. 6B are flowcharts for illustrating the flow of the processing of the selected character specification program PR.
Figure 6A:
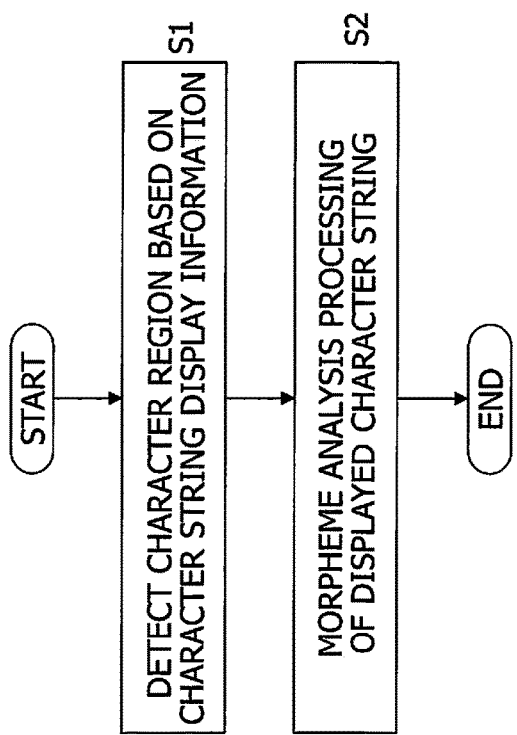

FIG. 6A and FIG. 6B are flowcharts for illustrating the flow of the processing of the selected character specification program PR according to the embodiment. FIG. 6A is a flowchart for illustrating the pre-processing of the selected character specification program PR according to the embodiment. Note that the processing of steps S1 and S2 in the flowchart of FIG. 6A may be performed at the input of a stroke.

First, the selected character specification program PR extracts character string display information relating to a displayed character string and detects the character region of each character of the displayed character string (S1). The character region represents, for example, the information of a region on a display screen on which each character is displayed. In addition, the character string display information includes, for example, the information of the position of the first character, the character size, the space, or the like of the displayed character string. The selected character specification program PR is allowed to calculate the coordinates of the character region of each character in the displayed character string based on the character string display information. For example, the selected character specification program PR is allowed to calculate the coordinates of the character region of the third character in the displayed character string by adding the widths of the first and second characters or the heights thereof to the coordinates of the first character.

Next, the selected character specification program PR generates word-by-word-basis segment information based on the morpheme analysis processing of the displayed character string (S2). The morpheme analysis processing represents analysis processing in which a character string is segmented into words as minimum units and the part of speech of each word is discriminated. For example, the character string "Tenki ga yoi (in Japanese language expression: It is a good weather (in English language expression)" is segmented into the words of the noun "tennki (in Japanese language expression: weather (in English language expression)" the postposition "ga (in Japanese language expression)" and the adjective "yoi (in Japanese language expression): good (in English language expression)" The word-by-word-basis segment information is used in the correction processing step (S15) of selected characters.

FIG. 6B is a flowchart for illustrating processing at the input of a stroke in the selected character specification program PR according to the embodiment. First, the start of inputting a stroke designated on a screen based on input operation information is detected (S11). Next, the selected character specification program PR starts analyzing the stroke (S12). Then, the end of inputting the stroke is detected (S13).

Next, the selected character specification program PR performs the specification processing of one or a plurality of successive selected characters based on the stroke and character regions (S14). The details of the processing of step S14 will be described later based on another flowchart.

Then, the selected character specification program PR performs the correction processing of the specified selected characters as corrected objects (S15). Specifically, in a case in which the selected characters include characters that do not constitute words at the beginning or the end thereof, the selected character specification program PR removes, for example, the characters that do not constitute words. Next, the selected character specification program PR fixes the corrected selected characters as selected characters (S16).

Specific Example

Character String Display Information

Figure 7:
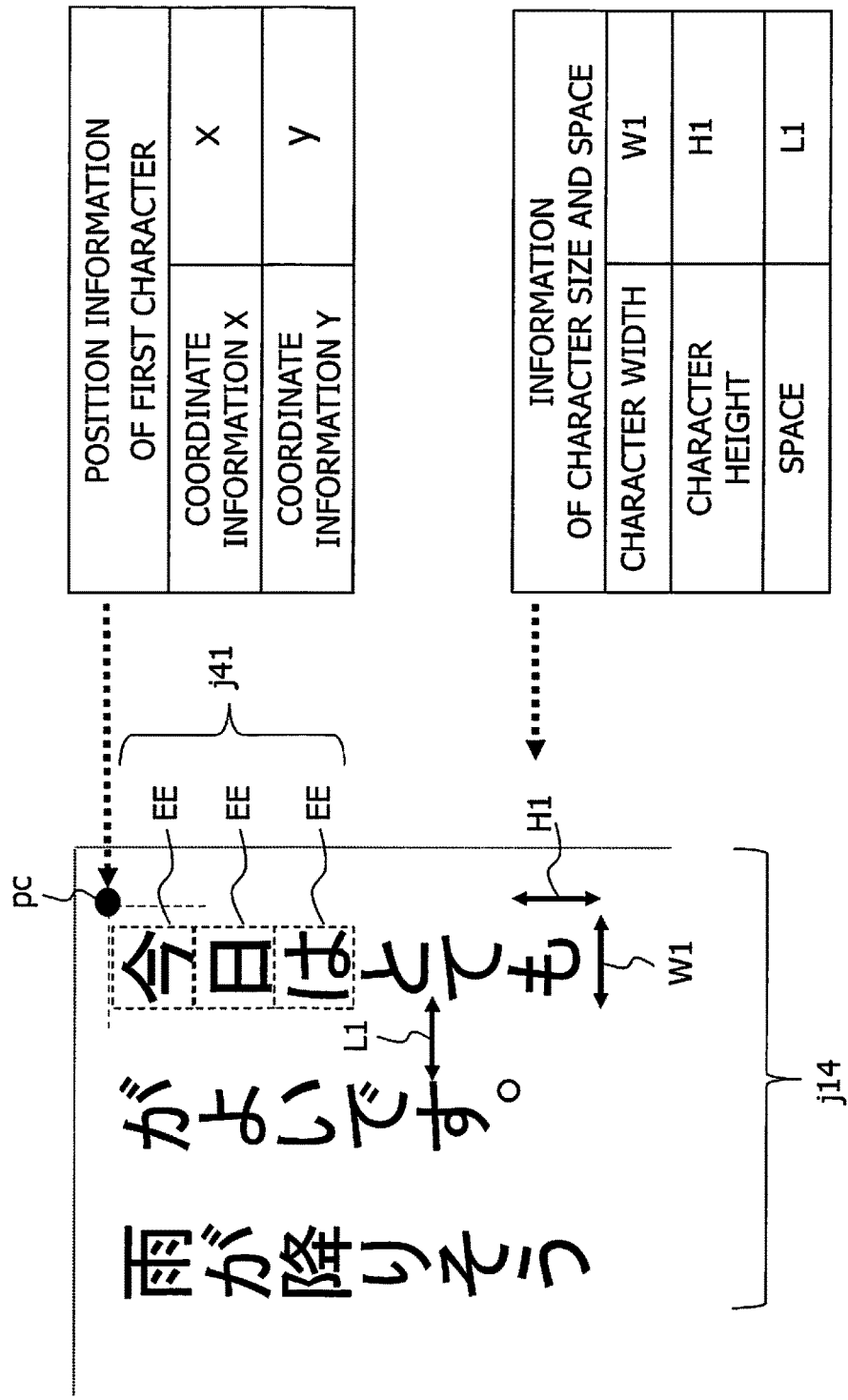
FIG. 7 is a first diagram illustrating a specific example of character string display information.

FIG. 7 is a first diagram illustrating a specific example of character string display information. In this example, the displayed character string "Kyou ha Totemo Tenki ga Yoi desu. Ame ga Furisou . . . (in Japanese language expression): It is a very good weather today. It seems to rain . . . (in English language expression)" j14 is illustrated. Although the character region EE of each of the characters "Kyou ha (in Japanese language expression)" j41 is illustrated in the example of FIG. 7, the character regions EE of all the characters of the displayed character string are detected in actual processing. Note that the display direction of the displayed character string is detected in advance. In addition, in this example, the size of each character of the displayed character string is uniform.

In the example of FIG. 7, the character string display information includes the information of the position of the first character of the displayed character string, the character size of the displayed character string, and the space L1 between lines of the displayed character string. The position information of the first character represents, for example, coordinate information pc(x,y) of the first character on a display screen. In addition, the character size of the displayed character string represents, for example, a width W1 and a height H1 of each character. Since the selected character specification program PR is capable of calculating the character region of each character based on the character string display information, it may be unnecessary for the selected character specification program PR to maintain the coordinate information of the character region of each character in advance. Thus, it is possible for the selected character specification program PR to reduce the amount of data to be maintained.

Figure 8:
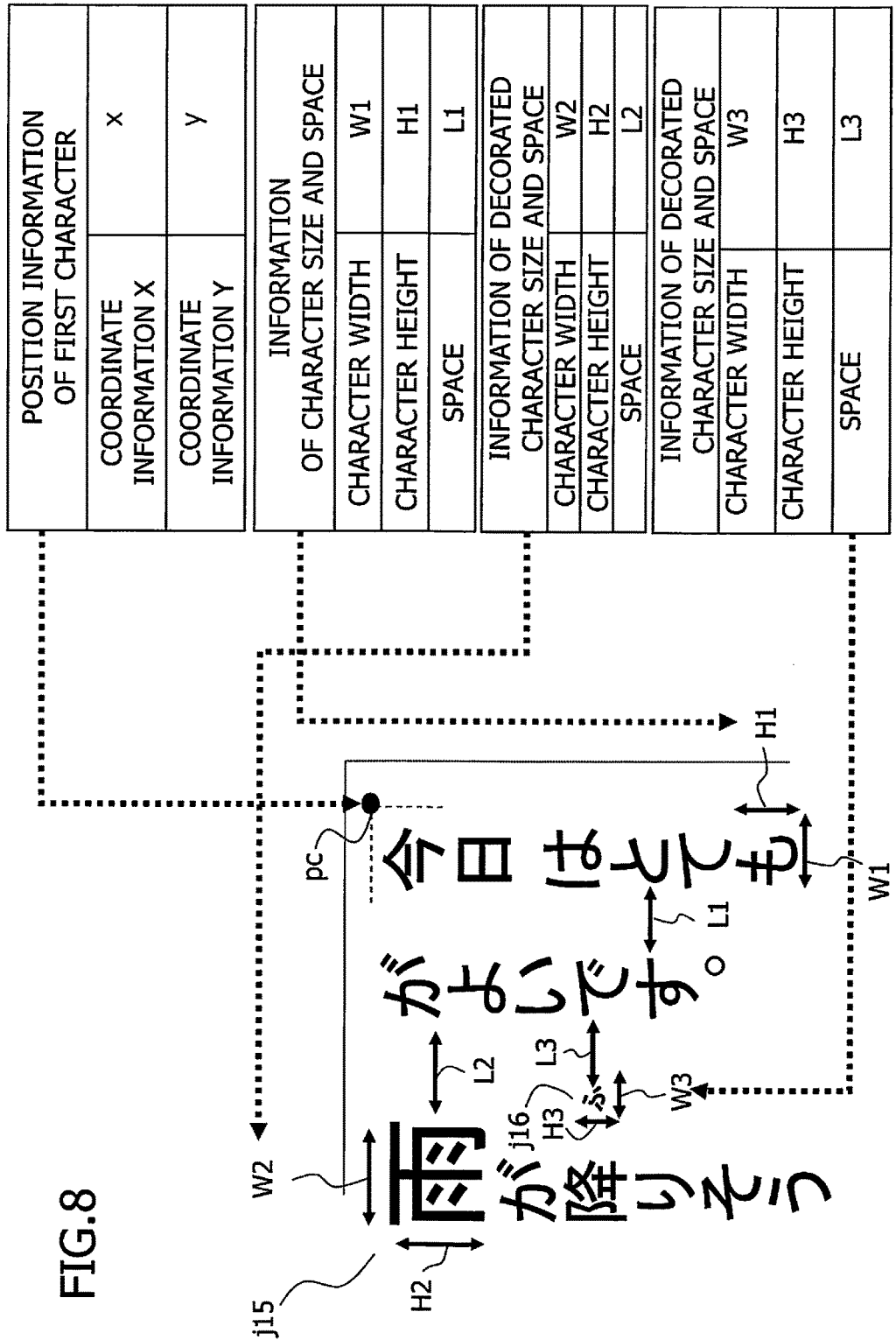
FIG. 8 is a second diagram illustrating a specific example of character string display information.

FIG. 8 is a second diagram illustrating a specific example of character string display information. In the example of FIG. 8, a displayed character string includes decorated characters. The decorated characters represent, for example, a character different in size from other characters, a ruby (kana reading), or the like. In the example of FIG. 8, the character "ame (in Japanese language expression)" j15 is greater in size, and the character "fu (in Japanese language expression)" j16 has a ruby affixed thereto.

In the example of FIG. 8, the character string display information includes the information of the character sizes and spaces L2 and L3 of the decorated characters, besides the information of the position of the first character, the character size, and space L1 between lines of the displayed character string. Specifically, the character string display information in FIG. 8 includes, as the character string display information of the decorated characters, the information of a width W2, a height H2, and the space L2 of the character "ame (in Japanese language expression)" j15 and the information of a width W3, a height H3, and the space L3 of the ruby "fu (in Japanese language expression)" j16.

Thus, even in a case in which the displayed character string includes the decorated characters, the selected character specification program PR is allowed to detect the character region of each character in the displayed character string based on the character string display information.

Next, the selected character specification processing in step S14 of the flowchart of FIG. 6B will be more specifically described.

(Flowchart: Selected Character Specification Processing)

Figure 9:
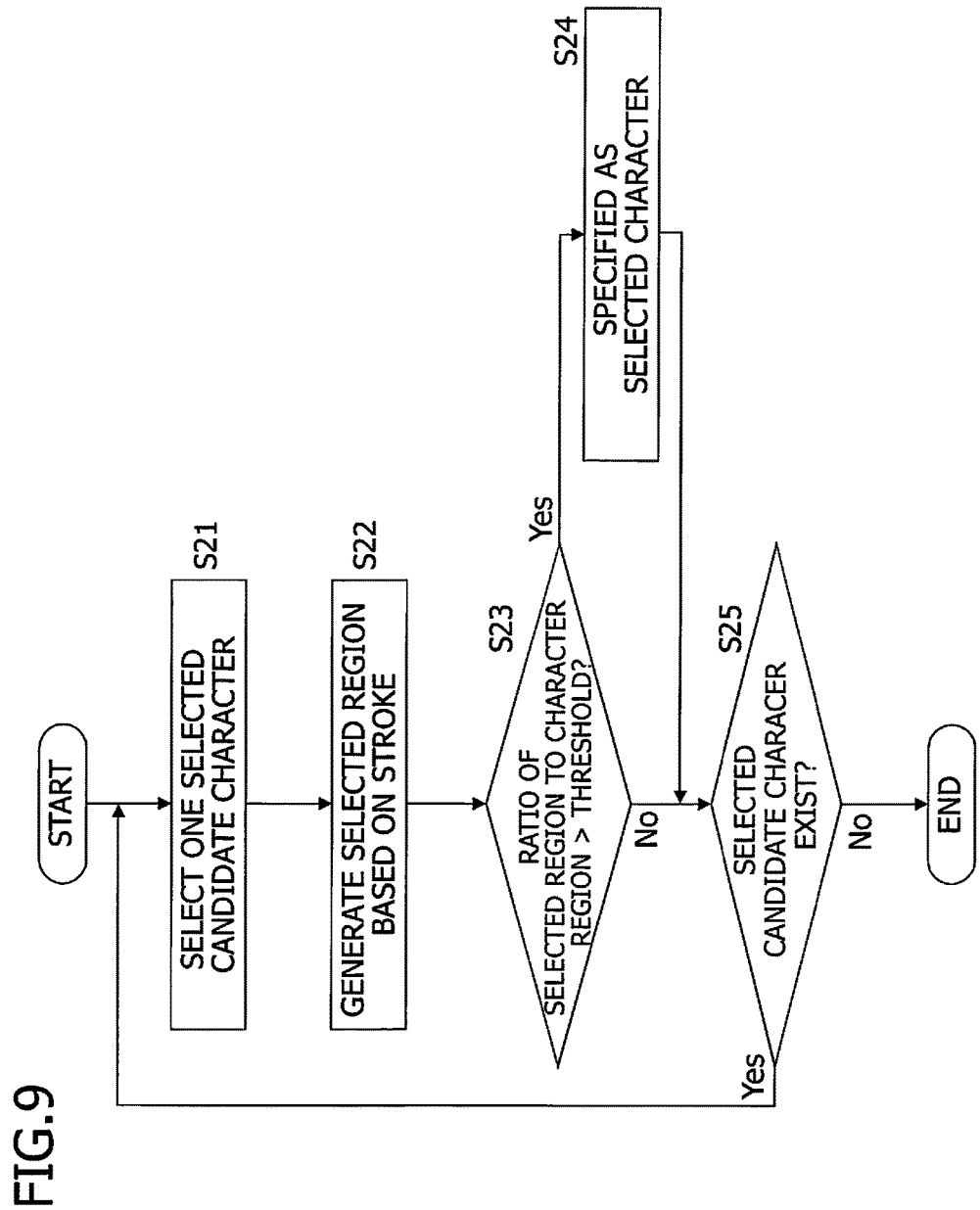
FIG. 9 is a flowchart for illustrating the selected character specification processing (S14 of FIG. 6B).

FIG. 9 is a flowchart for illustrating the selected character specification processing (S14 of FIG. 6B). First, the selected character specification program PR fixes one of characters overlapped with a stroke as a selected candidate character (S21). Next, the selected character specification program PR calculates the area of the selected region of the selected candidate character based on the detected stroke and a character region (S22). Then, when the ratio of the area of the selected region to the area of the character region exceeds a threshold (YES in S23), the selected character specification program PR specifies the selected candidate character as a selected character (S24). The details of the processing of steps S22 to S24 will be described later based on another flowchart.

On the other hand, when the ratio of the area of the selected region to the area of the character region does not exceed the threshold (NO in S23), the selected character specification program PR determines whether a non-fixed selected candidate character exists (S25). When a non-fixed selected candidate character exists (YES in S25), the selected character specification program PR fixes a next selected candidate character (S21). When a non-fixed selected candidate character does not exist (NO in S25), the selected character specification program PR ends the selected character specification processing (S14 of FIG. 6B).

Next, the details of the processing of steps S22 to S24 in the flowchart of FIG. 9 will be described based on a flowchart. First, a description will be given of processing in which the input stroke is the stroke of a closed curved line. When detecting the stroke of the closed curved line, the selected character specification program PR performs the processing of step S22 to S24 (FIG. 9) based on a next flowchart.

(Flowchart: Details of Selected Character Specification Processing (Stroke of Closed Curved Line))

Figure 10:
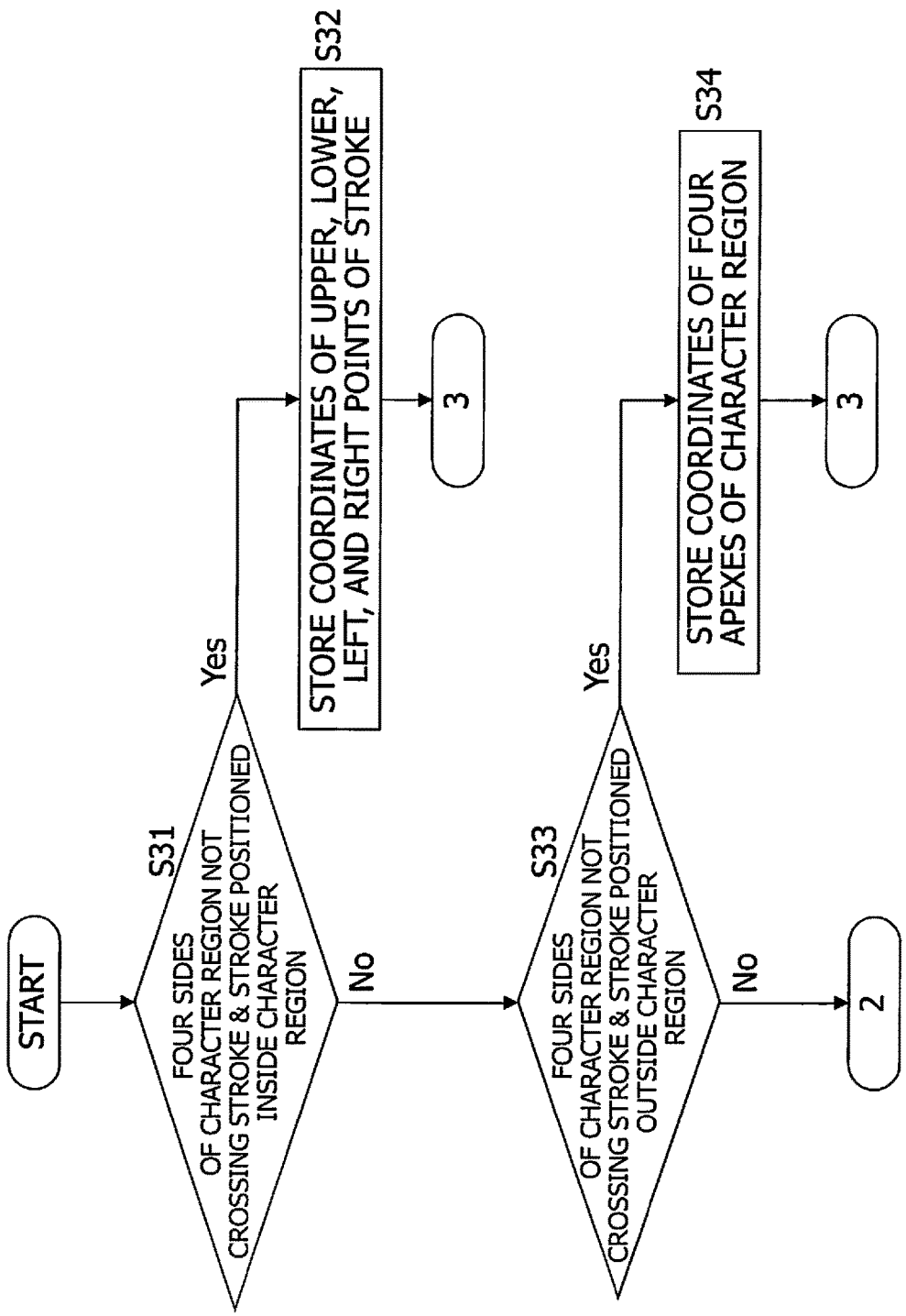
FIG. 10 is a first flowchart for illustrating the details of the selected character specification processing in a case in which the stroke of a closed curved line is input.

FIG. 10 is a first flowchart for illustrating the details of the selected character specification processing according to the embodiment in a case in which the stroke of a closed curved line is input. The processing of the flowchart of FIG. 10 corresponds to step S22 of FIG. 9.

First, the selected character specification program PR determines whether a stroke does not cross the four sides of the character region of a selected candidate character and is entirely positioned inside the character region (S31). When YES is determined in step S31, the selected character specification program PR stores the four apexes of the stroke, i.e., the coordinates of the uppermost, lowermost, leftmost, and rightmost points of the stroke (S32). Processing (3) subsequent to step S32 will be described later based on another flowchart.

Next, when NO is determined in step S31, the selected character specification program PR further determines whether the stroke does not cross the four sides of the character region of the selected candidate character and is entirely positioned outside the character region (S33). When YES is determined in step S33, the selected character specification program PR stores the coordinates of each apex of the character region of the selected candidate character (S34). The processing (3) subsequent to step S34 will be described later based on another flowchart. When NO is determined in step S33 (2), the selected character specification program PR proceeds to a next flowchart.

Figure 11:
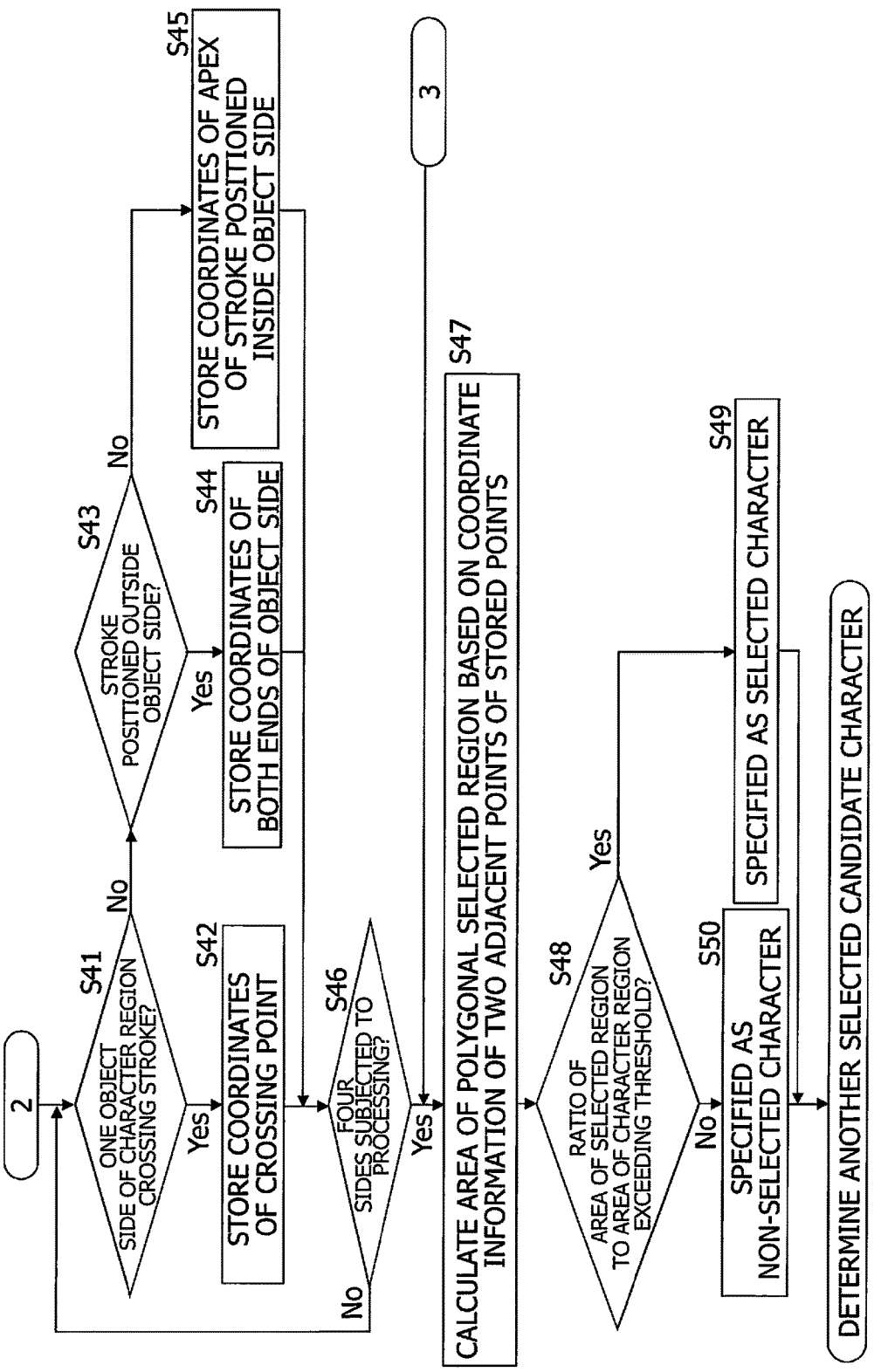
FIG. 11 is a second flowchart for illustrating the details of the selected character specification processing according to the embodiment.

FIG. 11 is a second flowchart for illustrating the details of the selected character specification processing according to the embodiment. The flowchart of FIG. 11 corresponds to steps S22 to S24 of FIG. 9.

When NO is determined in step S33 in the flowchart of FIG. 10, the selected character specification program PR subsequently determines whether the stroke crosses one object side of the character region of the selected candidate character (S41). When the stroke crosses the side (YES in S41), the selected character specification program PR stores the coordinates of each crossing point (S42). On the other hand, when the stroke does not cross the side (NO in S41), the selected character specification program PR determines whether the stroke is positioned outside the object side of the character region of the selected candidate character (S43). When the stroke does not cross the object side (NO in S41) and is positioned outside the object side (YES in S43), the selected character specification program PR stores the coordinates of both ends of the object side (S44). On the other hand, when the stroke does not cross the object side (NO in S41) and is positioned inside the object side (NO in S43), the selected character specification program PR stores the coordinates of the apex of the stroke positioned inside the object side (S45).

Next, the selected character specification program PR determines whether all the sides of the character region of the selected candidate character have been subjected to the processing of steps S41 to S45 as object sides (S46). When all the sides have not been subjected to the processing of steps S41 to S45 (NO in step S46), the selected character specification program PR causes a non-selected side to be subjected to the processing of steps S41 to S45. When all the sides have been subjected to the processing of steps S41 to S45 (YES in S46) or as the processing subsequent to steps S32 and S34 in the flowchart of FIG. 10, the selected character specification program PR generates a polygonal region, which is formed by connecting together the coordinates of two adjacent points based on all the stored points, as a selected region and calculates the area of the selected region (S47). An area S of the polygonal region is calculated by, for example, the following formula 1. It is possible to calculate the area of the polygonal region with the use of an exterior product from the position vector of each apex of the polygonal region. In the following formula 1, $(X_k - X_{k+1})$ $(Y_k - Y_{k+1})$ indicates a position vector in a case in which the apexes of the polygonal region are arranged in a counter-clockwise direction.

(Formula 1)

$$S = \frac{1}{2} \sum_{k=1}^{n} (X_k - X_{k+1})(Y_k - Y_{k+1})$$ formula 1

Then, the selected character specification program PR determines whether the ratio of the area of the calculated selected region to the area of the character region exceeds a threshold (S48). When the ratio of the area of the calculated selected region to the area of the character region exceeds the threshold (YES in S48), the selected character specification program PR specifies the selected candidate character as a selected character (S49). On the other hand, when the ratio is less than the threshold (NO in S48), the selected character specification program PR specifies the selected candidate character as a non-selected character (S50). Next, the selected character specification program PR performs the processing of the flowcharts of FIG. 10 and FIG. 11 on undetermined selected candidate characters.

Specific Example

Stroke of Closed Curved Line

Figure 12A:
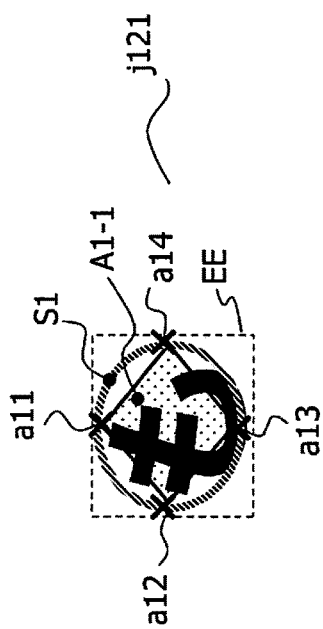
FIG. 12A and FIG. 12B are first diagrams each illustrating a specific example of the stroke of a closed curved line and a selected region.
Figure 12B:
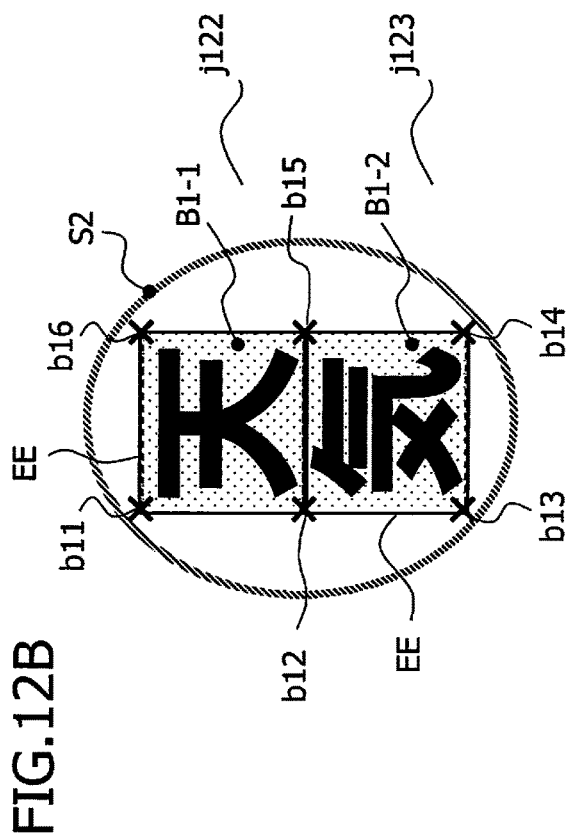

FIG. 12A and FIG. 12B are first diagrams each illustrating a specific example of the stroke of a closed curved line and a selected region. FIG. 12A and FIG. 12B are two case examples each illustrating the stroke of a closed curved line and a selected region.

Specific Example A

FIG. 12A illustrates an example of a case in which a stroke does not cross the four sides of the character region EE of the selected candidate character "mo (in Japanese language expression)" j121 and is entirely positioned inside the character region (YES in S31 of FIG. 10). Specifically, a stroke s1 does not cross the four sides of the character region EE of the selected candidate character "mo (in Japanese language expression)" j121 and is positioned inside the character region. Therefore, the coordinates of the uppermost, lowermost, leftmost, and rightmost points a11 to a14 of the stroke s1 are stored (S32). Then, a polygonal region A1-1 formed by connecting together the adjacent points of the coordinates based on the stored points a11 to a14 is calculated as a selected region (S47). For example, when the ratio of the area of the selected region A1-1 to the area of the character region EE exceeds a threshold (YES in S48), the selected candidate character "mo (in Japanese language expression)" j121 is specified as a selected character (S49).

Specific Example B

FIG. 12B illustrates an example of a case in which a stroke does not cross the four sides of the character regions EE of selected candidate characters and is entirely positioned outside the character regions (YES in S33 of FIG. 10). Specifically, a stroke s2 does not cross the four sides of the character region EE of each of the selected candidate characters "ten (in Japanese language expression)" j122 and "ki (in Japanese language expression)" j123 and is positioned outside each of the character regions EE. Therefore, the coordinates of the apexes b11, b12, b15, and b16 of the character region EE of the selected candidate character "ten (in Japanese language expression)" j122 and the coordinates of the apexes b12 to b15 of the character region EE of the selected candidate character "ki (in Japanese language expression)" j123 are stored (S34).

Then, a polygonal region B1-1 formed by connecting together the adjacent points of the coordinates based on the stored points b11, b12, b15, and b16 is calculated as the selected region of the selected candidate character "ten (in Japanese language expression)" j122 (S47). In addition, a polygonal region B1-2 formed by connecting together the adjacent points of the coordinates based on the points b12 to b15 is calculated as the selected region of the selected candidate character "ki (in Japanese language expression)" j123 (S47). Similarly, when the ratios of the areas of the selected regions B1-1 and B1-2 to the areas of the character regions EE exceed a threshold (YES in S48), the corresponding selected candidate characters are specified as selected characters (S49).

FIG. 13A to FIG. 13E are second diagrams each illustrating a specific example of the stroke of a closed curved line and a selected region. FIG. 13A to FIG. 13D are four case examples each illustrating the stroke of a closed curved line and a selected region.

Specific Example A

FIG. 13A illustrates an example of a case in which a stroke s3 crosses one or more object sides of the character regions EE of selected candidate characters (YES in S41 of FIG. 11) and a case in which the stroke s3 is positioned outside the object sides of the character regions EE of the selected candidate characters (YES in S43 of FIG. 11).

Specifically, the stroke s3 crosses the upper, left, and right sides of the character region EE of the selected candidate character "ten (in Japanese language expression)" j131 (YES in S41). Therefore, crossing points a21, a22, a28, and a29 between the stroke s3 and the upper, left, and right sides are stored (S42). In addition, the stroke s3 is positioned outside the lower side of the character region EE of the selected candidate character "ten (in Japanese language expression)" j131 (YES in S43). Therefore, the coordinates of points a23 and a27 of both ends of the lower side are stored (S44). Then, a polygonal region A2-1 formed by connecting together the adjacent points of the coordinates based on the stored points a21 to a23 and the points a27 to a29 is calculated as a selected region.

Similarly, the stroke s3 crosses the left and right sides of the character region EE of the selected candidate character "ki (in Japanese language expression)" j132 (YES in S41). Therefore, crossing points a24 and a26 between the stroke s3 and the left and right sides are stored (S42). In addition, since the stroke s3 is positioned outside the upper side of the character region EE of the selected candidate character "ki (in Japanese language expression)" j132 (YES in S43), the coordinates of points a23 and a27 of both ends of the upper side are stored (S44). Moreover, since the stroke s3 is positioned inside the lower side of the character region EE of the selected candidate character "ki (in Japanese language expression)" j132 (NO in S43), the coordinates of an apex a25 of the stroke s3 positioned inside the lower side are stored (S45). Then, a polygonal region A2-2 formed by connecting together the adjacent points of the coordinates based on the stored points a23 to a27 is calculated as a selected region.

Specific Example B

In FIG. 13B, a stroke s4 crosses the lower side of the character region EE of the selected candidate character "ten (in Japanese language expression)" j133 (YES in S41) and is positioned inside the upper, left, and right sides of the character region EE thereof (NO in S43). Therefore, a polygonal region B2-1 formed by connecting together adjacent points based on crossing points b22 and b24 between the stroke s4 and the lower side and apexes b21, b22, and b24 of the stroke s4 positioned inside the upper, left, and right sides is calculated as a selected region. In this example, the apex b22 of the stroke s4 positioned inside the left side and the apex b24 of the stroke s4 positioned inside the right side are the same as the crossing points b22 and b24 between the stroke s4 and the lower side.

In FIG. 13B, the stroke s4 crosses the upper side of the character region EE of the selected candidate character "ki (in Japanese language expression)" j134 (YES in S41) and is positioned inside the left, right, and lower sides of the character region EE thereof (NO in S43). Therefore, a polygonal region B2-2 formed by connecting together adjacent points based on the crossing points b22 and b24 between the stroke s4 and the upper side and the apexes b22 to b24 of the stroke s4 positioned inside the left, right, and lower sides is calculated as a selected region.

Specific Example C

In FIG. 13C, a stroke s5 crosses the upper, left, and right sides of the character region EE of the selected candidate character "ten (in Japanese language expression)" j135 (YES in S41) and is positioned outside the lower side of the character region EE thereof (YES in S43). Therefore, a polygonal region C2-1 formed by connecting together adjacent points based on crossing points c21, c22, and c28 between the stroke s5 and the upper, left, and right sides and apexes c23 and c27 of both ends of the lower side is calculated as a selected region. In addition, the stroke s5 crosses the left, right, and lower sides of the character region EE of the selected candidate character "ki (in Japanese language expression)" j136 (YES in S41) and is positioned outside the upper side thereof (YES in S43). Therefore, a polygonal region C2-2 formed by connecting together adjacent points based on crossing points c24, c26, and c25 between the stroke s5 and the left, right, and lower sides and the apexes c23 and c27 of both ends of the upper side is calculated as a selected region.

Specific Example D

In FIG. 13D, a polygonal region D2-1 formed based on crossing points d22 and d26 between a stroke s6 and the left and right sides of the character region EE of the selected candidate character "ten (in Japanese language expression)" j137 an apex d21 of the stroke s6 positioned inside the upper side thereof, and points d23 and d25 of both ends of the lower side thereof is calculated as a selected region. In addition, a polygonal region D2-2 based on crossing points d23 and d25 between the stroke s6 and the left and right sides of the character region EE of the selected candidate character "ki (in Japanese language expression)" j138 and an apex d24 of the stroke s6 positioned inside the lower side thereof is calculated as a selected region.

As described above, for each character of a displayed character string overlapped with the stroke of a closed curved line, the selected character specification program PR according to the embodiment generates, as a selected region, the overlapped region between a character region and a polygonal region formed by connecting together the uppermost, lowermost, leftmost, and rightmost points of the stroke of the closed curved line in the character region. Then, the selected character specification program PR specifies one or a plurality of successive characters, in which the ratio of the area of a selected region to the area of a character region exceeds a threshold, as selected characters.

Thus, the selected character specification program PR makes it possible to easily specify one or a plurality of successive selected characters based on the stroke of a closed curved line. In addition, even in a case in which a character is selected by a closed curved line likely to be overlapped with an undesired character, the selected character specification program PR specifies a selected character based on the ratio of the area of a selected region to the area of a character region. In this manner, the selected character specification program PR is allowed to specify only a desired character as a selected character. Thus, a user is allowed to efficiently select one or a plurality of successive characters more intuitively and more accurately based on the stroke of a closed curved line that facilitates the imagination of a corresponding area region.

(Another Generation Example of Selected Region)

In the embodiment, the selected character specification program PR generates a selected region based on the uppermost, lowermost, leftmost, and rightmost points of a closed curved line in a character region and the apexes of the character region. However, the generation of a selected region is not limited to this example. As illustrated in FIG. 13E, the selected character specification program PR may generate, as a selected region E2-1, the overlapped region between character regions and an internal region inscribed in the uppermost, lowermost, leftmost, and rightmost points of a closed curved line (S22 in FIG. 9). Then, among the characters of a displayed character string, the selected character specification program PR specifies one or a plurality of successive characters, in which the ratio of the area of the overlapped region E2-1 between the character regions EE and the region corresponding to the closed curved line to the areas of the character regions EE exceeds a threshold, as selected characters (S23 and S24 of FIG. 9).

Next, a description will be given of the selected character specification processing in cases in which strokes other than a closed curved line are input. First, specific examples of strokes other than a closed curved line will be illustrated.

(Strokes Other than Closed Curved Line)

Figure 14A:
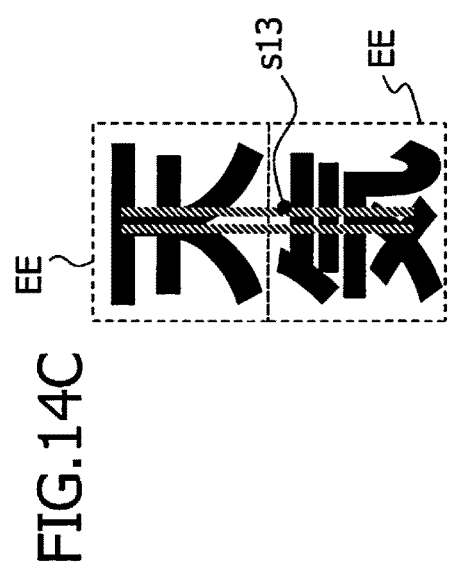
FIG. 14A to FIG. 14D are diagrams illustrating four examples of strokes other than a closed curved line.
Figure 14B:
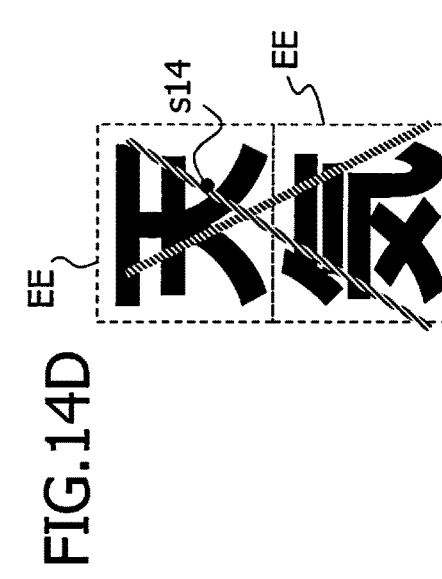

FIG. 14A to FIG. 14D are diagrams illustrating four examples of strokes other than a closed curved line. FIG. 14A illustrates an example of a case in which a stroke s11 of a meandering curved line (wavy line) is input. FIG. 14B illustrates an example of a case in which a stroke s12 of a broken line is input. As described above, a stroke may represent a curved line or a broken line. Since it is possible to input the stroke of a curved line or a broken line besides a closed curved line, a user is allowed to select a character based on a more intuitive operation.

Figure 14C:
Figure 14D:
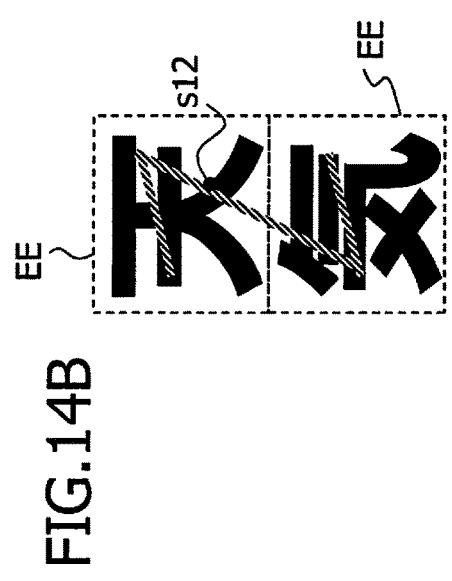

FIG. 14C illustrates an example of a case in which strokes s13 of two parallel straight lines are input. FIG. 14D illustrates an example of a case in which strokes s14 of two crossing straight lines are input. As described above, a stroke may include a plurality of lines. Note that although the plurality of strokes of straight lines is illustrated in this example, one or both of the lines may be curved lines, broken lines, or the like. In addition, the plurality of strokes may represent three or more strokes.

Next, a description will be given of the selected character specification processing in a case in which one stroke, i.e., the stroke of a curved line or a broken line is input. The selected character specification program PR performs the selected character specification processing based on the following flowchart in a case in which the shape of a stroke is not a closed curved line but a curved line or a broken line.

(Flowchart: Details of Selected Character Specification Processing (Stroke of Curved Line or Broken Line))

FIG. 15 is a first flowchart for illustrating the details of the selected character specification processing according to the embodiment in a case in which the stroke of a curved line or a broken line is input. The processing of the flowchart of FIG. 15 corresponds to step S22 of FIG. 9.

First, the selected character specification program PR acquires the coordinates of the uppermost end of a stroke in the character region of a selected candidate character (S61). Next, the selected character specification program PR determines whether the stroke is protruded in the direction of the upper side of the character region (S62). That is, the selected character specification program PR determines whether the stroke crosses the upper side of the character region. When the stroke is protruded in the direction of the upper side of the character region (YES in S62), the selected character specification program PR stores the coordinates of the crossing point between the stroke and the upper side of the character region (S63). On the other hand, when the stroke is not protruded in the direction of the upper side of the character region (NO in S62), the selected character specification program PR stores the coordinates of the uppermost end of the stroke (S64).

Then, the selected character specification program PR acquires the coordinates of the lowermost end of the stroke in the character region of the selected candidate character (S65). Next, the selected character specification program PR determines whether the stroke is protruded in the direction of the lower side of the character region (S66). That is, the selected character specification program PR determines whether the stroke crosses the lower side of the character region. When the stroke is protruded in the direction of the lower side of the character region (YES in S66), the selected character specification program PR stores the coordinates of the crossing point between the stroke and the lower side of the character region (S67). On the other hand, when the stroke is not protruded in the direction of the lower side of the character region (NO in S66), the selected character specification program PR stores the coordinates of the lowermost end of the stroke (S68).

Figure 16:
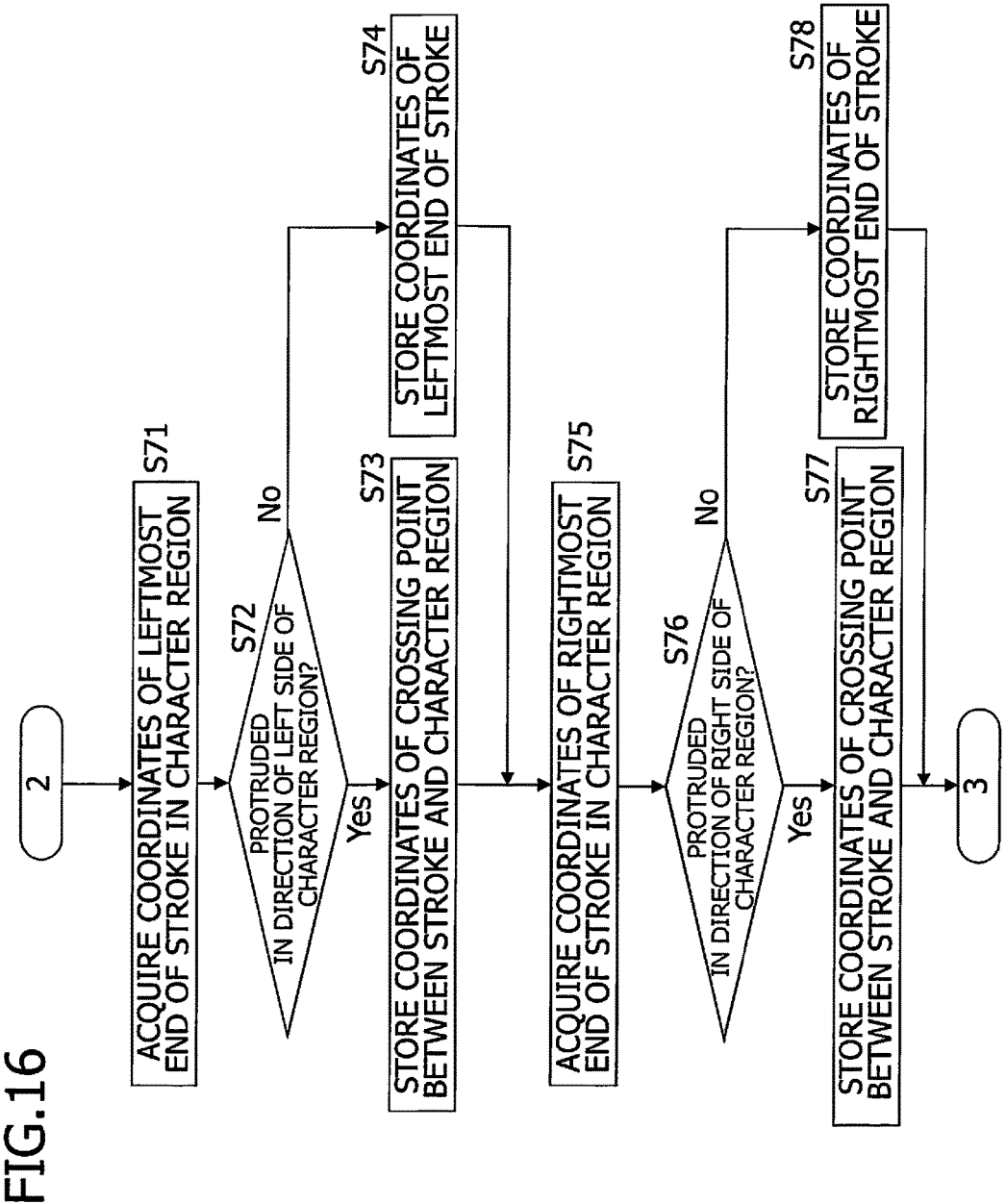
FIG. 16 is a second flowchart subsequent to the flowchart of FIG. 15.

FIG. 16 is a second flowchart for illustrating the details of the selected character specification processing according to the embodiment in a case in which the stroke of a curved line or a broken line is input. The processing of the flowchart of FIG. 16 corresponds to step S22 of FIG. 9.

Subsequent to the flowchart of FIG. 15, the selected character specification program PR acquires the coordinates of the leftmost end of the stroke in the character region of the selected candidate character (S71). Next, the selected character specification program PR determines whether the stroke is protruded in the direction of the left side of the character region (S72). That is, the selected character specification program PR determines whether the stroke crosses the left side of the character region. When the stroke is protruded in the direction of the left side of the character region (YES in S72), the selected character specification program PR stores the coordinates of the crossing point between the stroke and the left side of the character region (S73). On the other hand, when the stroke is not protruded in the direction of the left side of the character region (NO in S72), the selected character specification program PR stores the coordinates of the leftmost end of the stroke (S74).

Then, the selected character specification program PR acquires the coordinates of the rightmost end of the stroke in the character region of the selected candidate character (S75). Next, the selected character specification program PR determines whether the stroke is protruded in the direction of the right side of the character region (S76). That is, the selected character specification program PR determines whether the stroke crosses the right side of the character region. When the stroke is protruded in the direction of the right side of the character region (YES in S76), the selected character specification program PR stores the coordinates of the crossing point between the stroke and the right side of the character region (S77). On the other hand, when the stroke is not protruded in the direction of the right side of the character region (NO in S76), the selected character specification program PR stores the coordinates of the rightmost end of the stroke (S78).

Figure 17:
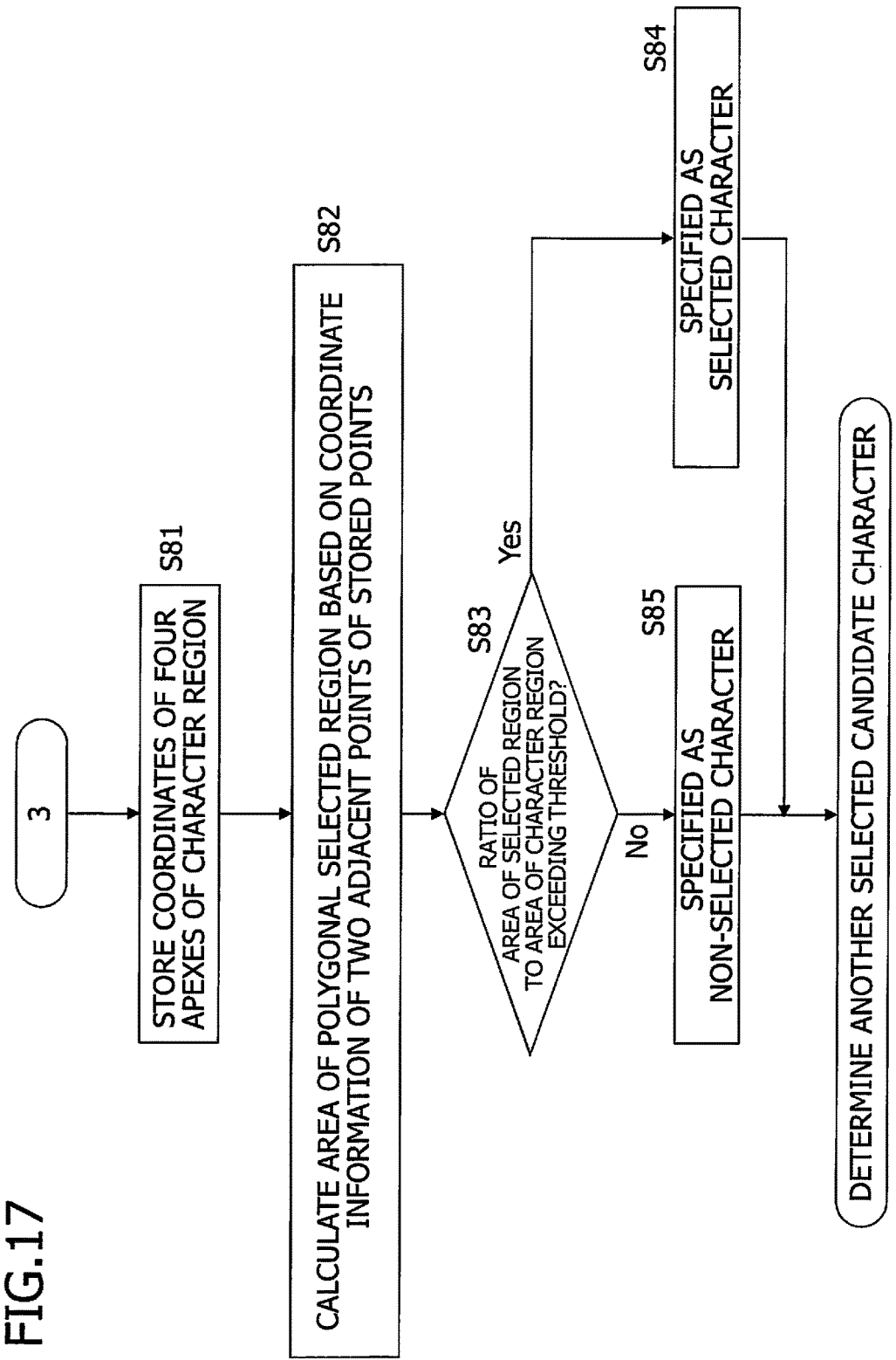
FIG. 17 is a third flowchart subsequent to the flowchart of FIG. 16.

FIG. 17 is a third flowchart for illustrating the details of the selected character specification processing according to the embodiment in a case in which the stroke of a curved line or a broken line is input. The processing of the flowchart of FIG. 17 corresponds to steps S22 to S24 of FIG. 9.

Subsequent to the flowchart of FIG. 16, the selected character specification program PR stores the coordinates of the four apexes of the character region of the selected candidate character (S81). Next, the selected character specification program PR generates a polygonal region, which is formed by connecting together two adjacent coordinates based on all the stored points, as a selected region and calculates the area of the selected region (S82). All the stored points include, for example, the apexes of the stroke, the crossing points between the stroke and the character region, the four apexes of the character region, or the like. As described above, the area of the polygonal region may be calculated based on the above formula 1.

Next, the selected character specification program PR determines whether the ratio of the area of the calculated selected region to the area of the character region exceeds a threshold (S83). When the ratio of the area of the calculated selected region to the area of the character region exceeds the threshold (YES in S83), the selected character specification program PR specifies the selected candidate character as a selected character (S84). On the other hand, when the ratio is less than the threshold (NO in S83), the selected character specification program PR specifies the selected candidate character as a non-selected character (S85). Then, the selected character specification program PR performs the processing of the flowcharts of FIG. 15 to FIG. 17 on undetermined selected candidate characters.

Specific Example

Stroke of Curved Line or Broken Line

FIG. 18A and FIG. 18B are diagrams each illustrating a specific example of the stroke of a curved line or a broken line and a selected region. FIG. 18A and FIG. 18B are two case examples each illustrating the stroke of a curved line or a broken line and a selected region.

Specific Example A

In the example of FIG. 18A, since a stroke s11 does not cross the upper side of the character region of the selected candidate character "ten (in Japanese language expression)" j181 (NO in S62 of FIG. 15), the coordinates of a point a32 of the uppermost end of the stroke s11 are stored (S64 of FIG. 15). In addition, since the stroke s11 crosses the lower side of the character region (YES in S66 of FIG. 15), the coordinates of a crossing point a29 between the stroke s11 and the lower side of the character region are stored (S67 of FIG. 15). Moreover, since the stroke s11 does not cross the left side of the character region (NO in S72 of FIG. 16), the coordinates of a point a22 of the leftmost end of the stroke s11 are stored (S74 of FIG. 16). In addition, since the stroke s11 does not cross the right side of the character region (NO in S76 of FIG. 16), the coordinates of a point a30 of the rightmost end of the stroke s11 are stored (S78 of FIG. 16).

Then, a polygonal region A3-1 is generated as a selected region based on the upper, lower, left, and right points a32, a29, a22, and a30 of the stroke s11 and apexes a21, a23, a28, and a31 of the character region. Specifically, the apex a21, the point a22 of the leftmost end, the apex a23, the apex a28, the point a30 of the rightmost end, the apex a31, the point a32 of the uppermost end, and the apex a21 are, for example, connected together. Since the point a29 of the lowermost end is positioned on the extension of a line segment connecting the apexes a23 and a28 together, it is omitted in this example.

Note that a method of generating a polygonal region based on a plurality of points is not limited to this example. A polygonal region may be generated based on the upper, lower, left, and right points a32, a29, a22, and a30 of the stroke s11 and the apexes a21, a23, a28, and a31 of the character region. In the embodiment, the selected character specification program PR generates a polygonal region by connecting together, for example, two adjacent points among object points.

Next, a description will be given of the selected candidate character "ki (in Japanese language expression)" j182 in the example of FIG. 18A. Since the stroke s11 crosses the upper side of the character region of the selected candidate character "ki (in Japanese language expression)" j182 (YES in S62 of FIG. 15), the coordinates of the crossing point a29 between the stroke s11 and the upper side of the character region are stored (S63 of FIG. 15). In addition, since the stroke s11 crosses the lower side of the character region (YES in S66 of FIG. 15), the coordinates of a crossing point a26 between the stroke s11 and the lower side of the character region are stored (S67 of FIG. 15). Moreover, since the stroke s11 does not cross the left side of the character region (NO in 72 of FIG. 16), the coordinates of a point a24 of the leftmost end of the stroke s11 are stored (S74 of FIG. 16). In addition, since the stroke s11 does not cross the right side of the character region (NO in S76 of FIG. 16), the coordinates of the point a29 of the rightmost end of the stroke s11 are stored (S78 of FIG. 16).

Then, a polygonal region A3-2 is generated as a selected region based on the upper, lower, left, and right points a29, a26, and a24 of the stroke s11 and the apexes a23, a25, a27, and a28 of the character region. Specifically, the apex a23, the point a24 of the leftmost end, the apex a25, the apex a27, the apex a28, and the apex a23 are, for example, connected together. Since the point a26 of the lowermost end is positioned on the extension of a line segment connecting the apexes a25 and a27 together, it is omitted in this example. In addition, since the point a29 is positioned on the extension of a line segment connecting the apexes a28 and a23 together, it is omitted in this example. Moreover, since the point a29 of the uppermost end is the same as the point a29 of the rightmost end, the apex a27 is, for example, directly connected to the apex a28. The generation of the polygonal region is not limited to this example, but it may be generated based on stored points.

Specific Example B

About the selected candidate character "ten (in Japanese language expression)" j183 in FIG. 18B, points b30, b22, and b29 are stored as the upper, lower, left, and right points of a stroke s12. Then, a polygonal region B3-1 is generated as a selected region based on the points b30, b22, and b29 and apexes b21, b23, b28, and b31 of the character region of the selected candidate character. Since the point b29 of the lowermost end is positioned on the extension of a line segment connecting the apexes b23 and b28 together, it is omitted in this example. In addition, since the point b30 of the uppermost end is the same as the point b30 of the rightmost end, the apex b31 is, for example, directly connected to the apex b21 in this example. About the selected candidate character "ki (in Japanese language expression)" j184 points b29, b24, and b27 are stored as the upper, lower, left, and right points of the stroke s12. Then, a polygonal region B3-2 is generated as a selected region based on the points b29, b24, and b27 and apexes b23, b25, b26, and b28 of the character region of the selected candidate character. Since the point b24 of the leftmost end is the same as the point b24 of the lowermost end, the apex b25 is, for example, directly connected to the apex b26 in this example.

As described above, the selected character specification program PR according to the embodiment generates, as a selected region, the overlapped region between a character region and a polygonal region formed by connecting together the uppermost, lowermost, leftmost, and rightmost points of one or a plurality of strokes in the character region and the apexes of the character region. Then, the selected character specification program PR specifies one or a plurality of successive characters, in which the ratio of the area of a selected region to the area of a character region exceeds a threshold, as selected characters.

Thus, the selected character specification program PR makes it possible to easily specify one or a plurality of successive selected characters based on the stroke of a curved line or a broken line. In addition, even in a case in which a character is selected by a closed curved line likely to be overlapped with an undesired character, the selected character specification program PR specifies a selected character based on the ratio of the area of a selected region to the area of a character region. In this manner, the selected character specification program PR is allowed to specify only a desired character as a selected character. Moreover, the selected character specification program PR generates a selected region based on a polygonal region formed by connecting together the uppermost, lowermost, leftmost, and rightmost points of a stroke and the apexes of a character region. In this manner, the selected character specification program PR is allowed to generate a wider selected region with a short stroke. Thus, a user is allowed to efficiently select one or a plurality of successive characters more intuitively and more accurately based on the stroke of a curved line, a broken line, or the like.

Next, a description will be given of the selected character specification processing in a case in which a plurality of strokes is input. The selected character specification program PR performs the selected character specification processing based on the following flowchart when a plurality of strokes is designated on a screen based on input operation information.

(Flowchart: Details of Selected Character Specification Processing (Plurality of Strokes))

Figure 19:
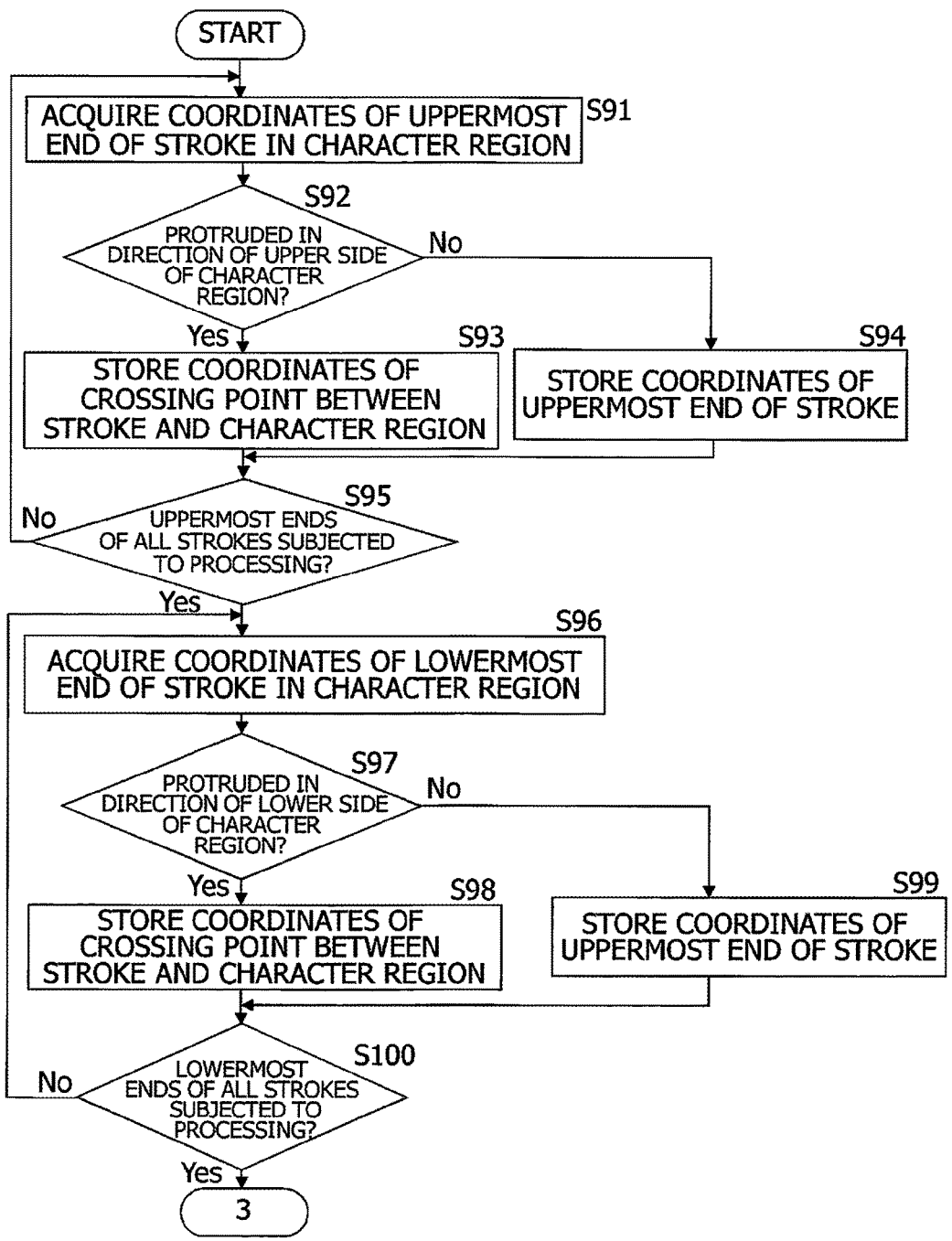
FIG. 19 is a flowchart for illustrating the details of the selected character specification processing in a case in which a plurality of strokes is input.

FIG. 19 is a flowchart for illustrating the details of the selected character specification processing according to the embodiment in a case in which a plurality of strokes is input. The processing of the flowchart of FIG. 19 corresponds to step S22 of FIG. 9.

First, the selected character specification program PR acquires the coordinates of the uppermost end of a stroke in the character region of a selected candidate character (S91). Next, the selected character specification program PR determines whether the stroke is protruded in the direction of the upper side of the character region (S92). That is, the selected character specification program PR determines whether the stroke crosses the upper side of the character region. When the stroke is protruded in the direction of the upper side of the character region (YES in S92), the selected character specification program PR stores the coordinates of the crossing point between the stroke and the upper side of the character region (S93). On the other hand, when the stroke is not protruded in the direction of the upper side of the character region (NO in S92), the selected character specification program PR stores the coordinates of the uppermost end of the stroke (S94).

Next, the selected character specification program PR determines whether the points of the uppermost ends of all of a plurality of strokes have been subjected to the determination processing (S91 to S94) (S95). When the points of the uppermost ends of all the strokes have not been determined (NO in S95), the selected character specification program PR performs the processing of steps S91 to S94 on the undetermined points of the uppermost ends of the strokes.

On the other hand, when the points of the uppermost ends of all the strokes have been determined (YES in S95), the selected character specification program PR acquires the coordinates of the lowermost end of the stroke in the character region of the selected candidate character (S96). Next, the selected character specification program PR determines whether the stroke is protruded in the direction of the lower side of the character region (S97). That is, the selected character specification program PR determines whether the stroke crosses the lower side of the character region. When the stroke is protruded in the direction of the lower side of the character region (YES in S97), the selected character specification program PR stores the coordinates of the crossing point between the stroke and the lower side of the character region (S98). On the other hand, when the stroke is not protruded in the direction of the lower side of the character region (NO in S97), the selected character specification program PR stores the coordinates of the lowermost end of the stroke (S99).

Next, the selected character specification program PR determines whether the points of the lowermost ends of all of a plurality of strokes have been subjected to the determination processing (S96 to S99) (S100). When the points of the lowermost ends of all the strokes have not been determined (NO in S100), the selected character specification program PR performs the processing of steps S96 to S99 on the undetermined points of the lowermost ends of the strokes. As described above, in a case in which a plurality of strokes is input, the uppermost and lowermost points of each of the strokes are stored. In this manner, the uppermost, lowermost, leftmost, and rightmost points of the strokes are substantially stored.

The subsequent processing is the same as that of the flowchart of FIG. 17. That is, the selected character specification program PR stores the coordinates of the four apexes of the character region of the selected candidate character (S81 of FIG. 17), generates a selected region by connecting together two adjacent coordinates based on all the stored points, and calculates the area of the selected region (S82). Then, when the ratio of the area of the calculated selected region to the area of the character region exceeds a threshold (YES in S83), the selected character specification program PR specifies the selected candidate character as a selected character (S84). When the ratio is less than the threshold (NO in S83), the selected character specification program PR specifies the selected candidate character as a non-selected character (S85).

Specific Example

Plurality of Strokes

FIG. 20A and FIG. 20B are diagrams each illustrating a specific example of a plurality of strokes and a selected region. FIG. 20A and FIG. 20B are two case examples each illustrating a plurality of strokes and a selected region.

Specific Example A

In the example of FIG. 20A, since two strokes s13 do not cross the upper side of the character region of the selected candidate character "ten (in Japanese language expression)" j201 (NO in S92 of FIG. 19), the coordinates of points a51 and a52 of the uppermost ends of the two strokes s13 are stored (S94 of FIG. 19). In addition, since the two strokes s13 cross the lower side of the character region (YES in S97 of FIG. 19), the coordinates of crossing points a42 and a49 between the two strokes s13 and the lower side of the character region are stored (S98 of FIG. 19).

Then, a polygonal region A4-1 is generated as a selected region based on the upper and lower points a51, a52, a42, and a49 of the two strokes s13 and apexes a41, a43, a48, and a50 of the character region. Specifically, the apex a41, the apex a43, the apex a48, the apex a50, the point a51 of a first uppermost end, the point a52 of a second uppermost end, and the apex a41 are, for example, connected together. Note that since the points a42 and a49 of the lowermost ends are positioned on the extension of a line segment connecting the apexes a43 and a48 together, they are omitted in this example.

In the example of FIG. 20A, since the two strokes s13 cross the upper side of the character region of the selected candidate character "ki (in Japanese language expression)" j202 (YES in S92 of FIG. 19), the coordinates of the crossing point a42 and a49 between the two strokes s13 and the upper side of the character region are stored (S93 of FIG. 19). In addition, since the two strokes s13 do not cross the lower side of the character region (NO in 97 of FIG. 19), the coordinates of points a45 and a46 of the lowermost ends of the two strokes s13 are stored (S99 of FIG. 19).

Then, a polygonal region A4-2 is generated as a selected region based on the upper and lower points a42, a49, a45, and a46 of the two strokes s13 and apexes a43, a44, a47, and a48 of the character region. Specifically, the apex a43, the apex a44, the point a45 of a first lowermost end, the point a46 of a second lowermost end, the apex a47, the apex a48, and the apex a43 are, for example, connected together. Note that since the points a42 and a49 of the uppermost ends are positioned on the extension of a line segment connecting the apexes a43 and a48 together, they are omitted in this example.

Specific Example B

In the example of FIG. 20B, since two strokes s14 do not cross the upper side of the character region of the selected candidate character "ten (in Japanese language expression)" j203 (NO in S92 of FIG. 19), the coordinates of points b52 and b50 of the uppermost ends of the two strokes s14 are stored (S94 of FIG. 19). In addition, since the two strokes s14 cross the lower side of the character region (YES in S97 of FIG. 19), the coordinates of crossing points b42 and b49 between the two strokes s14 and the lower side of the character region are stored (S98 of FIG. 19). Then, a polygonal region B4-1 is generated as a selected region based on the upper and lower points b52, b50, b42, and b49 of the two strokes s14 and apexes b41, b43, b48, and b51 of the character region.

In the example of FIG. 20B, since the two strokes s14 cross the upper side of the character region of the selected candidate character "ki (in Japanese language expression)" j204 (YES in S92 of FIG. 19), the coordinates of the crossing point b42 and b49 between the two strokes s14 and the upper side of the character region are stored (S93 of FIG. 19). In addition, since the two strokes s14 do not cross the lower side of the character region of the selected candidate character "ki (in Japanese language expression)" j204 (NO in 97 of FIG. 19), the coordinates of points b44 and b47 of the leftmost ends of the two strokes s14 are stored (S99 of FIG. 19). Note that in a case in which the two strokes s14 cross the left side or the right side of the character region at this time, the coordinates of the crossing point between the two strokes s14 and the left side or the right side of the character region are stored. Then, a polygonal region B4-2 is generated as a selected region based on the upper and lower points b42, b49, b44, and b47 of the two strokes s14 and apexes b43, b45, b46, and b48 of the character region.

As described above, even in a case in which a plurality of strokes is input, the selected character specification program PR according to the embodiment is allowed to generate, as a selected region, the overlapped region between a character region and a polygonal region formed by connecting together and the uppermost, lowermost, leftmost, and right-most points of one or a plurality of strokes in the character region and the apexes of the character region. Thus, as illustrated in FIG. 20A, even in a case in which short strokes are designated in a rectangle region including a plurality of strokes, it is possible to generate a large selected region. In addition, as illustrated in FIG. 20B, it is possible to select characters based on strokes that facilitate the imagination of the area of a rectangle region including a plurality of strokes. Thus, a user is allowed to efficiently select one or a plurality of successive characters easily and more intuitively based on short strokes.

(Another Generation Example of Selected Region)

FIG. 21A and FIG. 21B are diagrams each illustrating another generation example of a selected region. FIG. 21A and FIG. 21B are two case examples each illustrating the stroke of a curved line or a broken line and a selected region. In the examples, circumscribed rectangles A5e and B5e of strokes are generated, and selected regions are generated based on the apexes of the circumscribed rectangles A5e and B5e or the crossing points between the circumscribed rectangles A5e and B5e and the sides of character regions EE and the apexes of the character regions EE.

Specific Example A

In the example of FIG. 21A, the rectangle A5e circumscribing a stroke s11 is generated. Then, about the selected candidate character "ten (in Japanese language expression)" j211 points a61 and a71 of both ends of the upper side of the circumscribed rectangle A5e and crossing points a63 and a69 between the circumscribed rectangle A5e and the side of the character region EE are stored. Consequently, a polygonal region A5-1 is generated as a selected region based on the points a61, a71, a63, and a69 of the circumscribed rectangle A5e and apexes a61, a64, a70, and a72 of the character region EE. In addition, about the selected candidate character "ki (in Japanese language expression)" j212 the crossing points a63 and a69 between the circumscribed rectangle A5e and the side of the character region EE and crossing points a66 and a67 between the circumscribed rectangle A5e and the side of the character region EE are stored. Consequently, a polygonal region A5-2 is generated as a selected region based on the points a63, a69, a66, and a67 of the circumscribed rectangle A5e and the apexes a64, a65, a68, and a70 of the character region EE.

Specific Example B

In the example of FIG. 21B, the rectangle B5e circumscribing a stroke s12 is generated. Then, about the selected candidate character "ten (in Japanese language expression)" j213 points b62 and b71 of both ends of the upper side of the circumscribed rectangle B5e and crossing points b63 and b70 between the circumscribed rectangle B5e and the side of the character region EE are stored. Consequently, a polygonal region B5-1 is generated as a selected region based on the points b62, b71, b63, and b70 of the circumscribed rectangle B5e and apexes b61, b64, b69, and b72 of the character region EE. In addition, about the selected candidate character "ki (in Japanese language expression)" j214 the crossing points b63 and b69 between the circumscribed rectangle B5e and the side of the character region EE and points b65 and b68 of both ends of the lower side of the circumscribed rectangle B5e are stored. Consequently, a polygonal region B5-2 is generated as a selected region based on the points b63, b69, b65, and b68 of the circumscribed rectangle B5e and apexes b64, b66, b67, and b69 of the character region EE.

Note that a method of generating a selected region in FIG. 21A and FIG. 21B may be applied to a case in which a plurality of strokes is designated as illustrated in FIG. 20A and FIG. 20B. The selected character specification program PR generates, as a selected region, the overlapped region between a character region and a polygonal region formed by connecting together the circumscribed rectangle region of the uppermost, lowermost, leftmost, and rightmost points of a plurality of strokes and the apexes of the character region.

As described above, the selected character specification program PR may generate, as a selected region, the overlapped region between a character region and a polygonal region formed by connecting together the circumscribed rectangle region of the uppermost, lowermost, leftmost, and rightmost points of a stroke and the apexes of the character region (S22 of FIG. 9). Then, the selected character specification program PR specifies one or a plurality of successive characters, in which the ratio of the area of the selected region to the area of the character region exceeds a threshold, as selected characters (S23 and S24 of FIG. 9). Thus, the selected character specification program PR is allowed to generate a larger selected region with a short stroke. Therefore, a user is allowed to efficiently select one or a plurality of successive characters more intuitively and more accurately based on the strokes of one or a plurality of curved lines, broken lines, or the like.

Note that the selected character specification program PR according to the embodiment may generate, as a selected region, the overlapped region between a character region and the circumscribed rectangle region of the uppermost, lowermost, leftmost, and rightmost points of a stroke. In this case, the circumscribed rectangles A5e and B5e of the strokes s11 and s12 in FIG. 21A and FIG. 21B are, for example, generated as selected regions (S22 of FIG. 9). Then, for example, when the ratios of the areas of the circumscribed rectangles A5e and B5e of the strokes to the areas of the character regions EE exceed a threshold, the selected character specification program PR specifies the selected candidate characters as selected characters (S23 and S24 of FIG. 9). Thus, a user is allowed to select one or a plurality of successive characters more intuitively while imagining an area corresponding to the circumscribed rectangle of a stroke.

(Correction Processing of Selected Characters)

As described in the flowchart of FIG. 6B, the selected character specification program PR performs, for example, the correction processing of characters (S15 of FIG. 6B) after the selected character specification processing (S14 of FIG. 6B). Specifically, in a case in which selected characters include characters that do not constitute words at the beginning or the end thereof, the selected character specification program PR removes, for example, the characters as the correction processing.

At selecting characters displayed on the screen of the terminal, one or a plurality of words is generally selected. Accordingly, in a case in which selected characters include characters that do not constitute words at the beginning or the end thereof, it is assumed that the characters have been erroneously selected. Therefore, the selected character specification program PR removes, for example, the selected characters that do not constitute words to correct the erroneous selection of the characters. Thus, since characters desired by a user are highly likely to be specified as selected characters, the selected character specification program PR performs the selection processing of characters more accurately.

In the correction processing, the word-by-word-basis information of a displayed character string based on the morpheme analysis processing is, for example, used. As described in the flowchart of FIG. 6A, the selected character specification program PR performs, for example, the morpheme analysis processing of a displayed character string.

Figure 22:
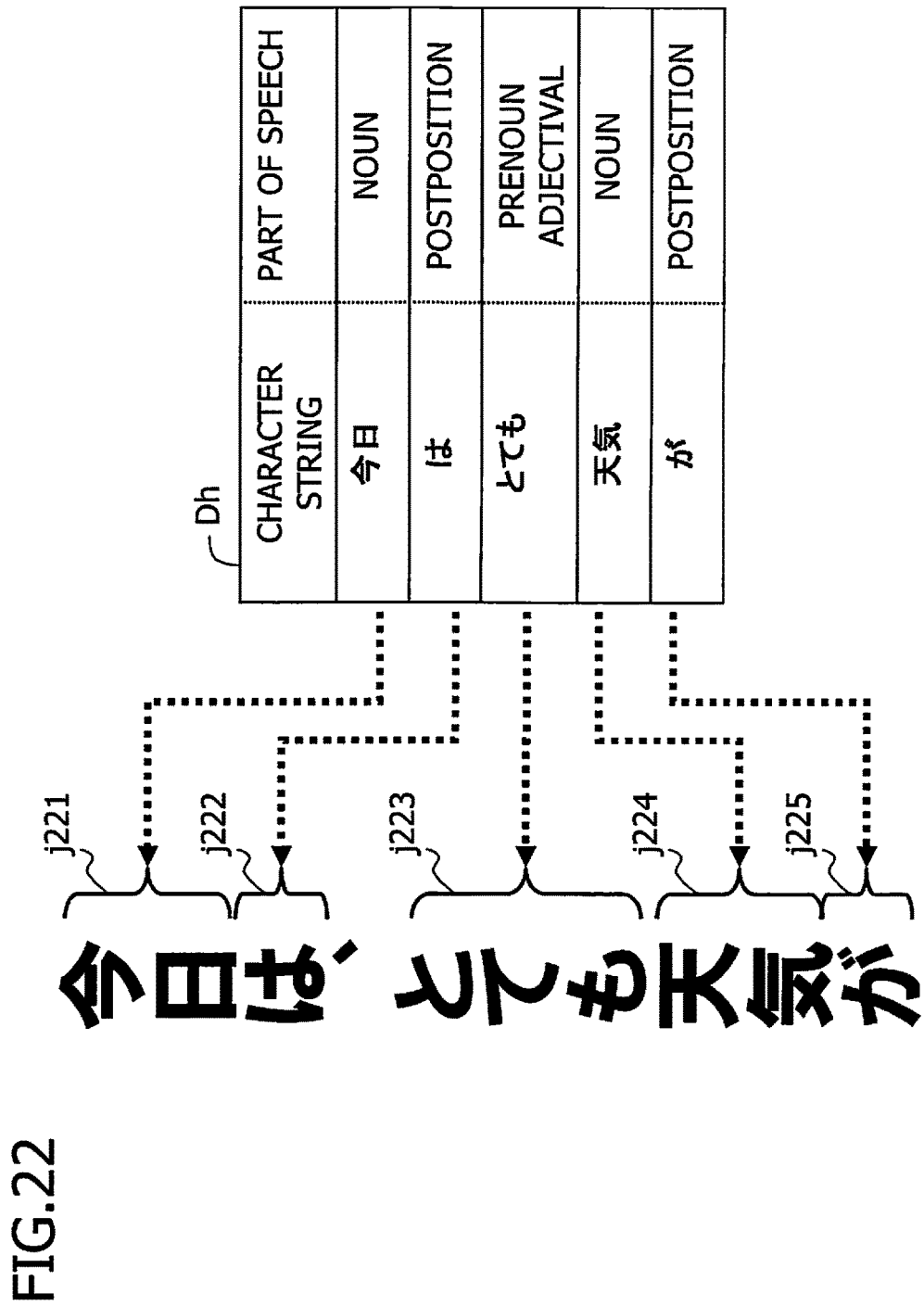
FIG. 22 is a diagram illustrating the morpheme analysis processing of a character string.

FIG. 22 is a diagram illustrating the morpheme analysis processing of a character string. In the table Dh of FIG. 22, the displayed character string "Kyou ha Totemo Tenki ga (in Japanese language expression)" j221-j225 is, for example, illustrated. The displayed character string "Kyou ha Totemo Tenki ga (in Japanese language expression)" is segmented into, for example, the words "Kyou" j221, "wa" j222, "Totemo" j223, "Tenki" j224, and "ga" j225 based on the morpheme analysis processing. Specifically, the word "Kyou" j221 represents a noun, the word "ha" j222 represents a postposition, the word "Totemo" j223 represents a prenoun adjectival, the word "Tenki" j224 represents a noun, and the word "ga" j225 represents a postposition.

The selected character specification program PR illustrates, for example, the displayed character string "Kyou ha Totemo Tenki ga Yoi desu. Asu ha Ame ga Furisou desu (in Japanese language expression): It is a very good weather today. It seems to rain tomorrow (in English language expression)." is, for example, illustrated. When the selected characters "Tenki ga yo (in Japanese language expression)" are specified, the selected character "yo (in Japanese language expression)" does not constitute a word in this example. Therefore, the selected character specification program PR corrects the selected characters "Tenki ga yo (in Japanese language expression)" into the selected characters "Tenki ga (in Japanese language expression)" as the correction processing. As another specific example, when the selected characters "Asu ha Ame ga Furisou de (in Japanese language expression)" are, for example, specified, the selected character specification program PR corrects the selected characters "Asu ha Ame ga Furisou de (in Japanese language expression)" into the selected characters "Asu ha Ame ga Furisou (in Japanese language expression)".

Note that in a case in which selected characters include characters that do not constitute words at the beginning or the end thereof, the selected character specification program PR may add a character so that the selected characters constitute words. Specifically, when the selected characters "Asu ha Ame ga Furisou de (in Japanese language expression)" are, for example, specified, the selected character specification program PR may correct the selected characters "Asu ha Ame ga Furisou de (in Japanese language expression)" into the selected characters "Asu ha Ame ga Furisou desu (in Japanese language expression)" based on the correction processing.

Modified Example

Figure 23:
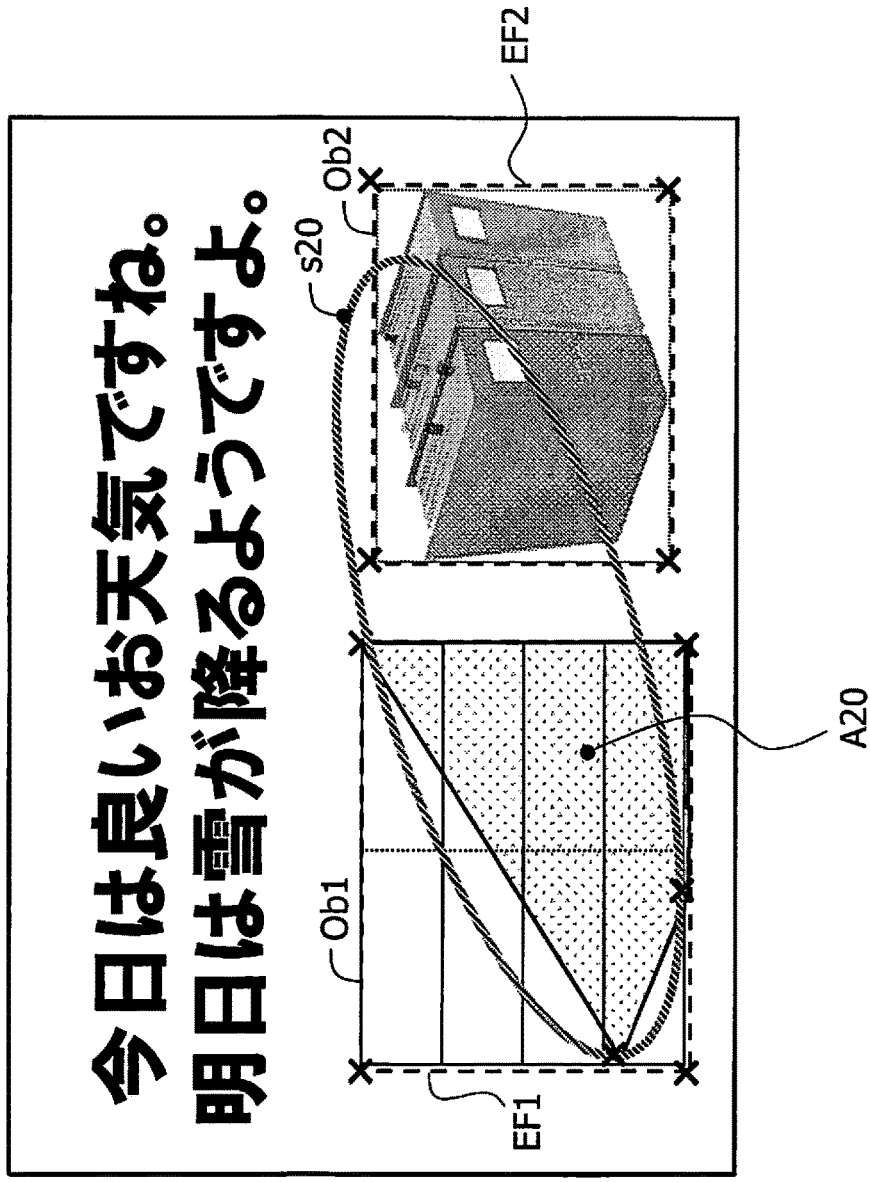
FIG. 23 is a diagram illustrating a modified example of the selected character specification processing.

FIG. 23 is a diagram illustrating a modified example of the selected character specification processing. The selected character specification program PR may apply the selected character specification processing according to the embodiment to, for example, objects such as tables, graphs, and figures, besides characters. In this case, as illustrated in FIG. 23, the selected character specification program PR detects display regions EF1 and EF2 (corresponding to the character regions) of a table Ob1 and a figure Ob2 as displayed objects, respectively. Then, the selected character specification program PR performs the specification processing of selected objects based on a stroke s20 and the display regions EF1 and EF2.

Specifically, the selected character specification program PR determines objects such as a figure and a graph overlapped with the stroke s20 as selected candidate objects. Next, the selected character specification program PR generates a selected region based on the stroke s20 and the display regions EF1 and EF2 for each of the selected candidate objects. A selected region is generated in the same manner as when a selected character is specified. For example, the selected character specification program PR calculates a selected region A20 based on the crossing points between the stroke s20 and the display region EF1, the upper, lower, left, and right points of the stroke s20 inside the display region EF1, the apexes of the display region EF1, or the like. Then, when the ratio of the area of the selected region A20 to the area of the display region EF1 exceeds a threshold, the selected character specification program PR specifies the selected region A20 as a selected object.

As described above, the selected character specification program PR according to the embodiment is applicable also not only to the selection processing of characters but also to the selection processing of objects. Thus, the selected character specification program PR makes it possible to easily specify one or a plurality of successive selected characters and objects based on the stroke of a closed curved line or the strokes of one or a plurality of curved lines or broken lines. Thus, a user is allowed to efficiently select one or a plurality of successive characters and objects more intuitively and more accurately based on a simple stroke.

The selected character specification processing of the selected character specification program PR according to the embodiment includes detecting a character region indicating a region, in which each character of a displayed character string is displayed on a screen, based on character string display information including the position of the first character of the displayed character string, the character size of each character of the displayed character string, and the space between lines of the displayed character strings, specifying a stroke of a closed curved line designated on the screen based on input operation information, and specifying a selected character. In the specifying the selected character, one or a plurality of successive characters, in which the ratio of the area of a selected region based on the uppermost, lowermost, leftmost, and rightmost points of the stroke of the closed curved line in the character region to the area of the character region exceeds a threshold, is specified as selected character among a respective character of the displayed character string overlapped with the stroke of the closed curved line.

As described above, the selected character specification program PR according to the embodiment makes it possible to easily specify one or a plurality of successive selected characters based on the stroke of a closed curved line surrounding a character as a selected object. In addition, the selected character specification program PR specifies a selected character according to the ratio of the area of a selected region based on the uppermost, lowermost, leftmost, and rightmost points of the stroke of a closed curved line in a character region to the area of the character region, whereby only a character as a selected object may be specified as a selected character even in a case in which the stroke is overlapped with a character as a non-selected object. In addition, the stroke of a closed curved line facilitates the intuitive imagination of a corresponding area region. Therefore, a user is allowed to select one or a plurality of successive characters more intuitively and more accurately based on the simple stroke of a closed curved line. Thus, the selected character specification program PR makes it possible to perform the selection processing of characters more efficiently.

In addition, the selected character specification program PR according to the embodiment may be provided as middleware. Therefore, each application operating on an OS uses the interface of the selected character specification program PR according to the embodiment and is thus allowed to implement the selection processing of characters more efficiently without being limited to the function of the character selection program of the OS. Moreover, since the selected character specification program PR is allowed to detect the display region of each character based on character string display information, it may be unnecessary for the selected character specification program PR to maintain the coordinate information of the character regions of all the characters. Therefore, it is possible for the selected character specification program PR to reduce the amount of data relating to the character region of each character.

In the selected character specification processing according to the embodiment, a selected region represents the overlapped region between a character region and an internal region inscribed in the uppermost, lowermost, leftmost, and rightmost points of a stroke. Alternatively, in the selected character specification processing according to the embodiment, a selected region represents the overlapped region between a character region and a polygonal region formed by connecting together the uppermost, lowermost, leftmost, and rightmost points of a stroke. Thus, the selected character specification program PR is allowed to easily calculate a selected region based on the stroke of a closed curved line. In addition, since a selected region corresponds to the range of a closed curved line, a user is allowed to select one or a plurality of successive characters more intuitively while imagining the region of an area corresponding to the closed curved line.

The selected character specification processing of the selected character specification program PR according to the embodiment includes detecting a character region indicating a region, in which each character of a displayed character string is displayed on a screen, based on character string display information including the position of the first character of the displayed character string, the character size of each character of the displayed character string, and the space between lines of the displayed character strings, specifying one or a plurality of strokes designated on the screen based input operation information, and specifying a selected character. In the specifying the selected character, one or a plurality of successive characters, in which the ratio of the area of a selected region based on the uppermost, lowermost, leftmost, and rightmost points of the one or the plurality of strokes in the character region to the area of the character region exceeds a threshold, is specified as selected character among a respective character of the displayed character string overlapped with the one or the plurality of strokes.

As described above, the selected character specification program PR according to the embodiment makes it possible to easily specify one or a plurality of successive selected characters based on one or a plurality of strokes. In addition, the selected character specification program PR specifies a selected character according to the ratio of the area of a selected region based on the uppermost, lowermost, leftmost, and rightmost points of one or a plurality of strokes in a character region to the area of the character region, whereby only a character as a selected object may be specified as a selected character even in a case in which the stroke is overlapped with a character as a non-selected object. Therefore, a user is allowed to select one or a plurality of successive characters more intuitively and more accurately based on one or a plurality of strokes. Thus, the selected character specification program PR makes it possible to perform the selection processing of characters more efficiently.

In addition, the selected character specification program PR according to the embodiment is provided as middleware. Therefore, each application operating on an OS uses the interface of the selected character specification program PR according to the embodiment and is thus allowed to perform the selection processing of characters more efficiently without being limited to the function of the character selection program of the OS. Moreover, since the selected character specification program PR is allowed to detect the display region of each character based on character string display information, it may be unnecessary for the selected character specification program PR to maintain the coordinate information of the character regions of all the characters. Therefore, it is possible for the selected character specification program PR to reduce the amount of data relating to the character region of each character.

In the selected character specification processing according to the embodiment, a stroke represents one of a curved line, a broken line, and a straight line, and a selected region represents the overlapped region between a character region and a polygonal region formed by connecting together the uppermost, lowermost, leftmost, and rightmost points of the stroke and the apexes of the character region. Thus, the selected character specification program PR is allowed to easily calculate a selected region based on the stroke of a curved line, a broken line, or a straight line. In addition, since a selected region is generated based on a polygonal region formed by connecting together the uppermost, lowermost, leftmost, and rightmost points of a stroke and the apexes of a character region, the selected character specification program PR is allowed to generate a larger selected region with a short stroke. Thus, a user is allowed to easily select characters with a short stroke.

In the selected character specification processing according to the embodiment, a stroke represents one of a curved line, a broken line, and a straight line, and a selected region represents the overlapped region between a character region and a polygonal region formed by connecting together the circumscribed rectangle region of the uppermost, lowermost, leftmost, and rightmost points of a stroke and the apexes of the character region. Thus, the selected character specification program PR is allowed to easily calculate a selected region based on the stroke of a curved line, a broken line, or a straight line. In addition, since a selected region is generated based on a polygonal region formed by connecting together the circumscribed rectangle region of the uppermost, lowermost, leftmost, and rightmost points of a stroke and the apexes of a character region, the selected character specification program PR is allowed to generate a large selected region with a shorter stroke. Thus, a user is allowed to easily select characters with a short stroke.

In the selected character specification processing according to the embodiment, a stroke represents one of a curved line, a broken line, and a straight line, and a selected region represents the overlapped region between a character region and the circumscribed rectangle region of the uppermost, lowermost, leftmost, and rightmost points of a stroke. Thus, the selected character specification program PR is allowed to easily calculate a selected region based on the stroke of a curved line, a broken line, or a straight line. In addition, since a selected region corresponds to the circumscribed rectangle region of a stroke, a user is allowed to select one or a plurality of successive characters more intuitively while imagining the circumscribed rectangle region of the stroke.

The selected character specification processing according to the embodiment further includes segmenting the specified selected characters into words based on a morpheme analysis and removing one or a plurality of characters that does not constitute words at the beginning or the end of the selected characters. Thus, even in a case in which selected characters include characters that do not constitute words at the beginning or the end thereof due to the erroneous selection of the characters, the selected character specification program PR is allowed to remove the selected characters that do not constitute words to correct the erroneous correction of the characters. Thus, the selected character specification program PR is allowed to perform the selection processing of characters more accurately.

In the selected character specification processing according to the embodiment, a displayed character string includes decorated characters, character string display information further includes the position of the decorated character, a character size of the decorated character, and space between lines of the decorated character, and a character region is detected for each character of a displayed character string including decorated characters in the detecting the character region. In addition, decorated character represents any or both of a character to which character size is expanded or reduced and character affixed as rubies. Thus, even in a case in which a displayed character string includes decorated characters, the selected character specification program PR is allowed to detect the character region of each character based on character string display information. Therefore, it is unnecessary for the selected character specification program PR to maintain the coordinate information of the character regions of all characters, and it is possible for the selected character specification program to reduce the amount of data relating to the character region of each character.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable medium storing a selected character specification program that causes a computer to execute a process comprising:
   detecting a character region indicating a region, in which each character of the displayed character string is displayed on a screen;
   specifying a stroke of a closed curved line designated on the screen based on input operation information; and
   specifying one or a plurality of successive characters, in which a ratio of an area of a selected region to an area of the character region exceeds a threshold, the selected region representing a polygonal region that includes, as apexes, uppermost, lowermost, leftmost, and rightmost points in the character region of the stroke of the closed curved line, as selected character among a respective character of the displayed character string overlapped with the stroke of the closed curved line.

2. The non-transitory computer-readable medium storing the selected character specification program according to claim 1, wherein the selected region further represents a region overlapped between the character region and an internal region inscribed in the uppermost, lowermost, leftmost, and rightmost points of the stroke.

3. The non-transitory computer-readable medium storing the selected character specification program according to claim 1, wherein the process further comprises segmenting the specified selected characters into words based on a morpheme analysis and removing one or a plurality of characters, each of which does not constitute a word, at a beginning or an end of the selected characters from the selected characters.

4. The non-transitory computer-readable medium storing the selected character specification program according to claim 1, wherein the detecting the character region based on character string display information includes a position of a first character of the displayed character string, a character size of each character of the displayed character string, and space between lines of displayed character strings.

5. The non-transitory computer-readable medium storing the selected character specification program according to claim 4, wherein
   the displayed character string includes a decorated character,
   the character string display information further includes a position of the decorated character, a character size of the decorated character, and space between lines of the decorated character, and
   the character region is detected for each character of the displayed character string including the decorated character in the detecting the character region.

6. The non-transitory computer-readable medium storing the selected character specification program according to claim 5, wherein the decorated character represents one or both of a character to which character size is expanded or reduced and a character affixed with a ruby.

7. A non-transitory computer-readable medium storing a selected character specification program that causes a computer to execute a process comprising:
   detecting a character region indicating a region, in which each character of the displayed character string is displayed on a screen;
   specifying one or a plurality of strokes designated on the screen based on input operation information; and
   specifying one or a plurality of successive characters, in which a ratio of an area of a selected region to an area of the character region exceeds a threshold, the selected region representing a polygonal region that includes, as apexes, apexes of the character region and uppermost, lowermost, leftmost, and rightmost points in the character region of the one or the plurality of strokes, as selected character among a respective character of the displayed character string overlapped with the one or the plurality of strokes.

8. The non-transitory computer-readable medium storing the selected character specification program according to claim 7, wherein
   the stroke represents any of a curved line, a broken line, and a straight line, and
   the selected region further represents an overlapped region between the character region and a circumscribed rectangle region of the uppermost, lowermost, leftmost, and rightmost points of the stroke.

9. A selected character specification device comprising:
   a memory; and
   a processor coupled to the memory and configured to execute a process including:
   detecting a character region indicating a region, in which each character of the displayed character string is displayed on a screen;
   specifying a stroke of a closed curved line designated on the screen based on input operation information; and
   specifying one or a plurality of successive characters, in which a ratio of an area of a selected region to an area of the character region exceeds a threshold, the selected region representing a polygonal region that includes, as apexes, uppermost, lowermost, leftmost, and rightmost points in the character region of the stroke of the closed curved line, as selected character among a respective character of the displayed character string overlapped with the stroke of the closed curved line.

10. A non-transitory computer-readable medium storing a selected character specification program that causes a computer to execute a process comprising:
    detecting a character region indicating a region, in which each character of the displayed character string is displayed on a screen;
    specifying one or a plurality of strokes designated on the screen based on input operation information; and
    specifying one or a plurality of successive characters, in which a ratio of an area of a selected region to an area of the character region exceeds a threshold, the selected region representing a polygonal region that includes, as apexes, apexes of the character region and apexes of a circumscribed rectangle region of uppermost, lowermost, leftmost, and rightmost points in the character region of the one or the plurality of strokes, as a selected character among a respective character of the displayed character string overlapped with the one or the plurality of strokes.

* * * * *